(12) United States Patent
Bremmon et al.

(10) Patent No.: US 7,823,847 B2
(45) Date of Patent: Nov. 2, 2010

(54) DISPLAY MOUNT WITH POST-INSTALLATION ADJUSTMENT FEATURES

(75) Inventors: Jeff Bremmon, Shakopee, MN (US); Jamie Brandt, Shakopee, MN (US)

(73) Assignee: Milestone AV Technologies LLC, Savage, MN (US)

( * ) Notice: Subject to any disclaimer, the term of this patent is extended or adjusted under 35 U.S.C. 154(b) by 0 days.

(21) Appl. No.: 12/348,799

(22) Filed: Jan. 5, 2009

(65) Prior Publication Data

US 2009/0200439 A1 Aug. 13, 2009

Related U.S. Application Data

(63) Continuation-in-part of application No. 29/319,787, filed on Jun. 15, 2008, now Pat. No. Des. 595,277, and a continuation-in-part of application No. 29/319,788, filed on Jun. 15, 2008, now Pat. No. Des. 612,182, and a continuation-in-part of application No. 29/319,789, filed on Jun. 15, 2008, now Pat. No. Des. 610,436, and a continuation-in-part of application No. 29/319,790, filed on Jun. 15, 2008, now Pat. No. Des. 595,702, and a continuation of application No. 29/319,792, filed on Jun. 15, 2008, now Pat. No. Des. 610,437.

(60) Provisional application No. 61/019,104, filed on Jan. 4, 2008.

(51) Int. Cl.
*F16M 11/00* (2006.01)
(52) U.S. Cl. .................. 248/201; 248/286.1; 248/298.1; 248/920
(58) Field of Classification Search .................. 248/480, 248/124.1, 201, 286.1, 298.1, 917, 920
See application file for complete search history.

(56) References Cited

U.S. PATENT DOCUMENTS 212,618 A 2/1879 Miller (Continued)

FOREIGN PATENT DOCUMENTS

KR 10-2007-0022915 A 2/2007

(Continued)

OTHER PUBLICATIONS

International Search Report for PCT/US2009/030147, mailed Mar. 23, 2009, 1 Pg.

(Continued)

*Primary Examiner*—J. Allen Shriver, II
*Assistant Examiner*—Bradley H Duckworth
(74) *Attorney, Agent, or Firm*—Patterson Thuente Christensen Pedersen, P.A.

(57) ABSTRACT

A display mount with post-installation adjustment features according to embodiments of the present disclosure addresses the above-mentioned needs of the industry. The mount may include two or more wall brackets, each having a vertically shiftable carrier assembly. Cross-supports extend between the carrier assemblies and are received in floating connection structures in the carriers. An electronic display display is coupled with the cross-supports. The carrier assembly of each wall bracket is independently vertically shiftable to shift the orientation of the cross-supports, and thereby adjust the vertical position and orientation of the electronic display device coupled with the cross-supports. The electronic display may be coupled to the cross-supports with display interface brackets which are tilt-adjustable to change the tilt position of the display device.

21 Claims, 23 Drawing Sheets

U.S. PATENT DOCUMENTS

| | | |
|---|---|---|
| 1,282,489 A | 10/1918 | Strodel |
| 1,574,227 A | 2/1926 | Andersen |
| 2,233,882 A | 3/1941 | Bobek |
| 2,734,708 A | 2/1956 | Cohn |
| 3,146,738 A | 9/1964 | Telarico |
| 3,182,946 A | 5/1965 | Dudko |
| 3,188,030 A | 6/1965 | Fischer |
| 3,464,661 A | 9/1969 | Alesi, Jr. |
| 3,574,340 A | 4/1971 | Busche |
| 3,698,329 A | 10/1972 | Diamond et al. |
| D232,917 S | 9/1974 | Vincent |
| 3,856,246 A | 12/1974 | Sinko |
| 4,202,520 A | 5/1980 | Loos et al. |
| D260,336 S | 8/1981 | Springer |
| D266,827 S | 11/1982 | Withrow |
| D279,249 S | 6/1985 | Fausel |
| D282,328 S | 1/1986 | Brescia et al. |
| D293,404 S | 12/1987 | Murphy |
| 4,718,317 A | 1/1988 | Hensler |
| 4,814,759 A | 3/1989 | Gombrich |
| 4,938,005 A | 7/1990 | Focke |
| D311,130 S | 10/1990 | Whitaker |
| 5,007,608 A | 4/1991 | Carroll, Jr. |
| 5,069,411 A * | 12/1991 | Murphy ..................... 248/476 |
| 5,139,223 A | 8/1992 | Sedighzadeh |
| 5,165,644 A | 11/1992 | Allen |
| 5,195,900 A | 3/1993 | Kumagai et al. |
| 5,322,255 A | 6/1994 | Garret |
| 5,348,385 A | 9/1994 | Berg |
| D359,643 S | 6/1995 | Langmade |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,713,549 A | 2/1998 | Shieh |
| 5,743,503 A | 4/1998 | Voeller et al. |
| 5,751,548 A | 5/1998 | Hall et al. |
| D395,892 S | 7/1998 | Solomon |
| D400,085 S | 10/1998 | Haskin |
| 5,827,441 A | 10/1998 | Solbjorg |
| 5,842,672 A | 12/1998 | Sweere et al. |
| 5,854,735 A | 12/1998 | Cheng |
| D406,476 S | 3/1999 | Boije |
| 5,918,841 A | 7/1999 | Sweere et al. |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,802 A | 11/1999 | Campbell |
| 5,992,809 A | 11/1999 | Sweere et al. |
| D417,611 S | 12/1999 | Van de Lande |
| 6,012,693 A | 1/2000 | Voeller |
| 6,015,120 A | 1/2000 | Sweere et al. |
| 6,019,332 A | 2/2000 | Sweere et al. |
| 6,042,068 A | 3/2000 | Tcherny |
| 6,045,103 A | 4/2000 | Costa et al. |
| 6,048,013 A | 4/2000 | Moilanen et al. |
| 6,061,104 A | 5/2000 | Evanicky et al. |
| 6,068,227 A | 5/2000 | Morgan et al. |
| D426,142 S | 6/2000 | Moore |
| 6,102,348 A | 8/2000 | O'Neill |
| 6,113,047 A | 9/2000 | Wung |
| 6,126,128 A | 10/2000 | Costa et al. |
| 6,189,850 B1 | 2/2001 | Liao et al. |
| D440,863 S | 4/2001 | Worrall |
| 6,213,821 B1 | 4/2001 | Bernloehr et al. |
| 6,273,382 B1 | 8/2001 | Pemberton |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,830 B1 | 4/2002 | Lu |
| 6,394,403 B1 | 5/2002 | Hung |
| 6,402,109 B1 | 6/2002 | Dittmer |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,478,275 B1 | 11/2002 | Huang |
| 6,484,987 B2 | 11/2002 | Weaver |
| 6,494,429 B2 | 12/2002 | Tajima |
| 6,517,040 B1 | 2/2003 | Wen |
| 6,527,466 B1 | 3/2003 | Blier |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,325 S | 7/2003 | Theis |
| D477,606 S | 7/2003 | Theis |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,644,609 B1 | 11/2003 | Scott |
| 6,654,235 B2 | 11/2003 | Imsand |
| 6,663,064 B1 | 12/2003 | Minelli et al. |
| D485,161 S | 1/2004 | Hutchinson |
| 6,671,928 B2 | 1/2004 | Huang |
| 6,672,553 B1 | 1/2004 | Lin |
| D488,708 S | 4/2004 | Lam |
| 6,752,363 B2 | 6/2004 | Boele |
| D493,800 S | 8/2004 | Pfister |
| D494,183 S | 8/2004 | Wills |
| D494,596 S | 8/2004 | Pfister |
| D494,978 S | 8/2004 | Pfister |
| D495,713 S | 9/2004 | Pfister |
| D495,714 S | 9/2004 | Pfister |
| D496,367 S | 9/2004 | Pfister |
| D497,537 S | 10/2004 | O'Keene et al. |
| D503,331 S | 3/2005 | Sjoberg |
| D505,477 S | 5/2005 | Rager |
| 6,886,701 B2 | 5/2005 | Hong et al. |
| 6,905,101 B1 | 6/2005 | Dittmer |
| D507,477 S | 7/2005 | Pfister |
| 6,923,413 B2 | 8/2005 | Dozier |
| D512,903 S | 12/2005 | Gallien |
| D517,085 S | 3/2006 | Deuschle |
| 7,028,961 B1 | 4/2006 | Dittmer |
| D520,017 S | 5/2006 | Kuijk |
| D520,794 S | 5/2006 | Grover |
| 7,063,296 B2 | 6/2006 | Williams |
| D530,595 S | 10/2006 | Lam et al. |
| D531,489 S | 11/2006 | Concari et al. |
| D532,290 S | 11/2006 | David |
| D533,483 S | 12/2006 | Simmons et al. |
| 7,152,836 B2 | 12/2006 | Pfister |
| 7,178,774 B2 * | 2/2007 | Kim ..................... 248/279.1 |
| 7,178,775 B2 | 2/2007 | Pfister |
| D538,140 S | 3/2007 | Hau et al. |
| D538,141 S | 3/2007 | Stenhouse et al. |
| D538,632 S | 3/2007 | Hau et al. |
| D539,125 S | 3/2007 | Hau et al. |
| D539,126 S | 3/2007 | Stenhouse |
| D539,128 S | 3/2007 | Hau et al. |
| D539,636 S | 4/2007 | Bremmon |
| D539,637 S | 4/2007 | Hau et al. |
| D539,639 S | 4/2007 | Nagle |

| | | | | | | |
|---|---|---|---|---|---|---|
| D540,154 S | 4/2007 | Bremmon | | 2007/0181762 A1 | 8/2007 | Dittmer |
| D545,604 S | 7/2007 | Eyman et al. | | 2007/0193481 A1 | 8/2007 | Wiebe et al. |
| D546,103 S | 7/2007 | Eyman et al. | | 2008/0054147 A1 | 3/2008 | Muday et al. |
| D549,232 S | 8/2007 | Li et al. | | 2008/0068784 A1 | 3/2008 | Bouissiere |
| D549,636 S | 8/2007 | Dial | | 2008/0156949 A1 | 7/2008 | Schuller et al. |
| D553,125 S | 10/2007 | Hau et al. |
| D553,483 S | 10/2007 | Grey |
| 7,300,029 B2 | 11/2007 | Petrick et al. |
| D559,658 S | 1/2008 | Wohlford |
| D560,411 S | 1/2008 | Chung |
| D560,670 S | 1/2008 | Anderson et al. |
| D560,671 S | 1/2008 | Muday et al. |
| D560,672 S | 1/2008 | Muday et al. |
| D561,562 S | 2/2008 | Wohlford |
| D561,775 S | 2/2008 | Wohlford et al. |
| D563,416 S | 3/2008 | Bremmon |
| D563,962 S | 3/2008 | Grey |
| D565,054 S | 3/2008 | Anderson et al. |
| D565,388 S | 4/2008 | Concari |
| D565,399 S | 4/2008 | Grey |
| D570,199 S | 6/2008 | Bremmon |
| D570,355 S | 6/2008 | Muday et al. |
| D570,852 S | 6/2008 | Muday et al. |
| D581,914 S | 12/2008 | Bures et al. |
| D587,036 S | 2/2009 | Russell |
| D587,504 S | 3/2009 | Russell |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084396 A1 | 7/2002 | Weaver |
| 2002/0179801 A1 | 12/2002 | Kim |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0245420 A1 | 12/2004 | Pfister et al. |
| 2005/0152102 A1 | 7/2005 | Shin |
| 2005/0194498 A1 | 9/2005 | Burns et al. |
| 2005/0236548 A1 | 10/2005 | Maruta |
| 2006/0065800 A1 | 3/2006 | Bremmon |
| 2006/0291152 A1 | 12/2006 | Bremmon |
| 2007/0007413 A1* | 1/2007 | Jung et al. ............... 248/284.1 |
| 2007/0023593 A1 | 2/2007 | Fedewa |
| 2007/0041150 A1 | 2/2007 | Short et al. |
| 2007/0158515 A1 | 7/2007 | Dittmer |
| 2007/0176067 A1 | 8/2007 | Monaco |

FOREIGN PATENT DOCUMENTS

| KR | 10-2007-0096626 A | 10/2007 |
|---|---|---|
| KR | 10-2007-0120689 A | 12/2007 |

OTHER PUBLICATIONS

Chief Manufacturing, Inc., *Full-Line Product Guide 2004*, Jan. 2004, 64 Pgs.
Chief Manufacturing, Inc., *The Focus: Presentation Support Solutions*, Jan. 2003, 80 Pgs.
Chief Manufacturing, Inc., *The Focus: Presentation Support Solutions*, Full-Line Product Guide, Apr. 2002, 66 Pgs.
Mounts by PDR, A Division of David Engineering, *Panel Display Pivot Mount*, 4 Pgs.
Fimco, *Wall Mount Kit for Plasma TV Screens*, Nov. 2003, 12 Pgs.
Peerless, *SmartMount™ Universal Tilt Wall Mount for 32" to 50" Plasma and LCD Flat Panel Screens*, 2006, 2 Pgs.
Peerless, *SmartMount™ Universal Tilt Wall Mount for 61" to 102" Plasma and LCD Flat Panel Screens*, 2006, 2 Pgs.
Peerless, *SmartMount™ Universal Tilt Wall Mount for 42" to 71" Plasma and LCD Flat Panel Screens*, 2006, 2 Pgs.
Peerless, *SmartMount™ Universal Tilt Wall Mount for 32" to 60" Plasma and LCD Flat Panel Screens*, 2006, 2 Pgs.
Peerless, *SmartMount™ Universal Tilt Wall Mount for 23" to 46" LCD Flat Panel Screens*, 2006, 2 Pgs.
Peerless, *SmartMount™ Universal Flat Wall Mount for 61" to 102" Plasma and LCD Flat Panel Screens*, 2006, 2 Pgs.
Peerless, *SmartMount™ Universal Flat Wall Mount for 42" to 71" Plasma and LCD Flat Panel Screens*, 2006, 2 Pgs.
Peerless, *SmartMount™ Universal Flat Wall Mount for 32" to 60" Plasma and LCD Flat Panel Screens*, 2006, 2 Pgs.
Peerless, *SmartMount™ Universal Flat Wall Mount for 23" to 46" LCD Flat Panel Screens*, 2006, 2 Pgs.
Peerless, *SmartMount™ Universal Tilt Wall Mount for 22" to 49" Screens*, Mar. 31, 2005, 12 Pgs.
Viewsonic, Mount, 2005, 1 Pg.
Hitachi, Mount, 2005, 1 Pg.
Instruction Manual for Superior Mount, dated Feb. 1, 2007, 12 Pgs.
Chief Manufacturing, Inc., Full Line Catalog, *Mounting Solutions Product Guide*, Copyright Jun. 2006, 122 Pgs.
Sanus Visionmount Catalog, copyright Mar. 2007, 40 Pgs.

* cited by examiner

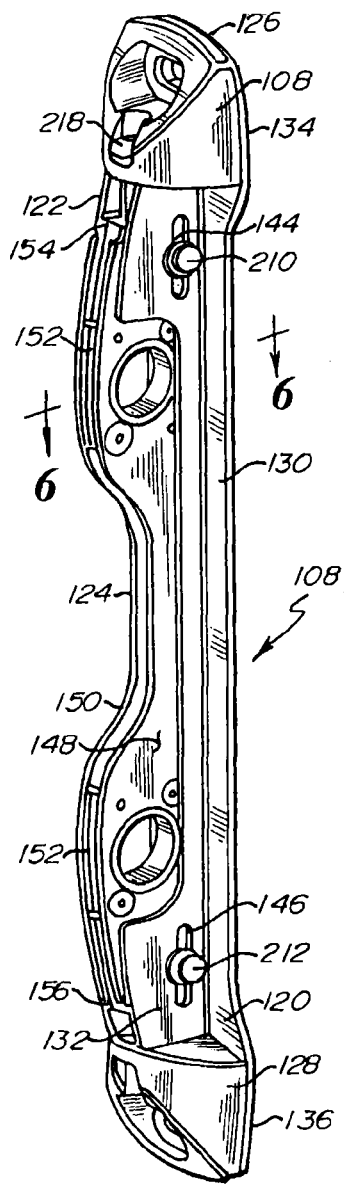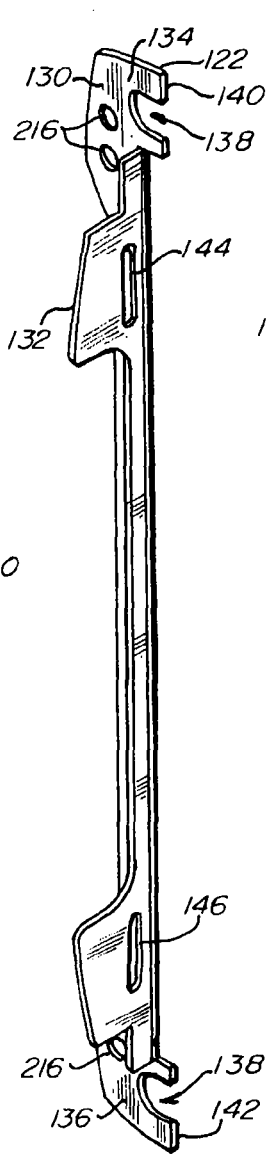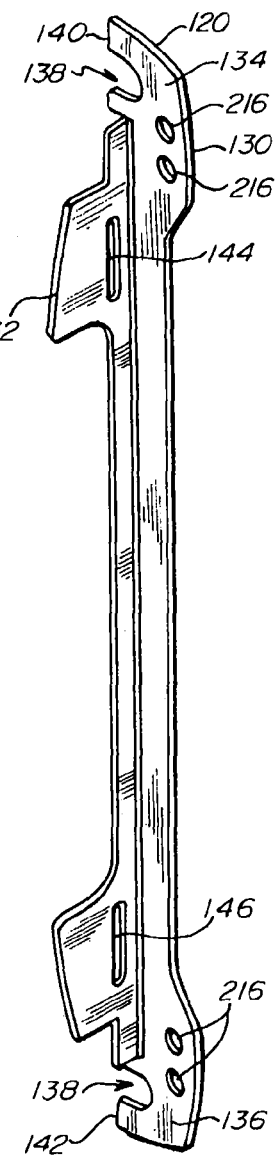
*Fig.2.*  *Fig.3.*  *Fig.4.*

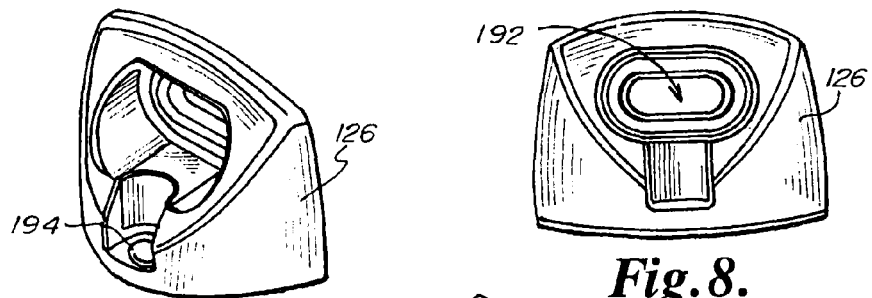
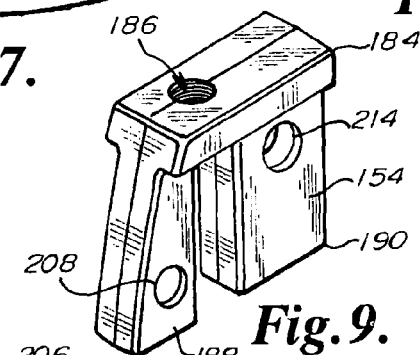
Fig.7. Fig.8. Fig.9.
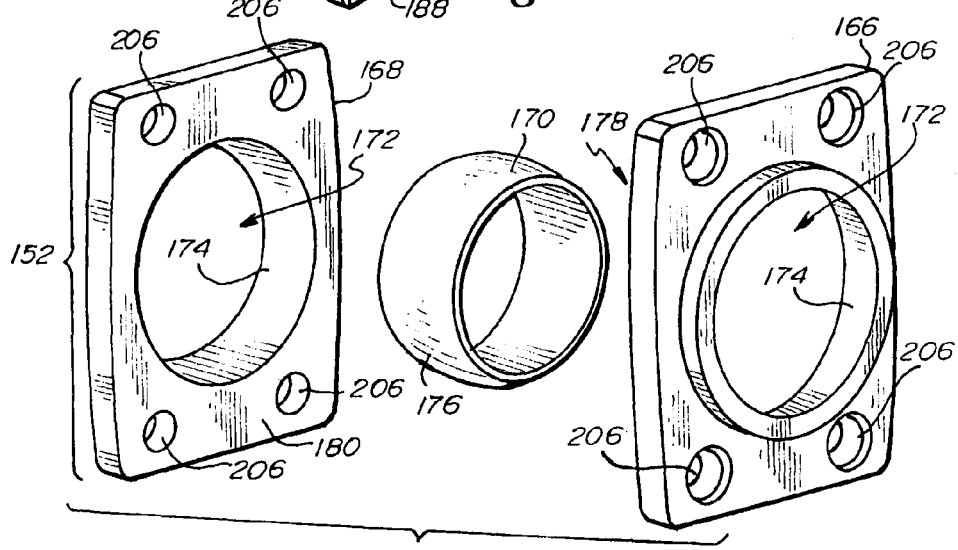
Fig.10.

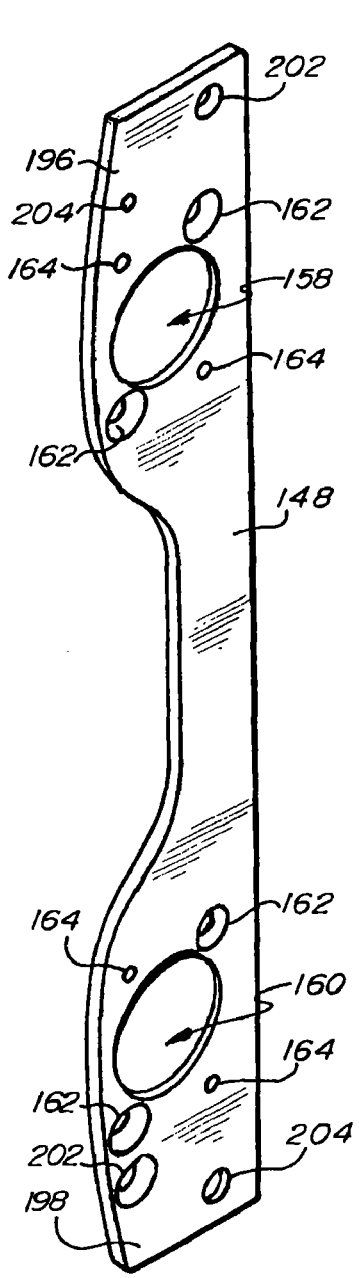
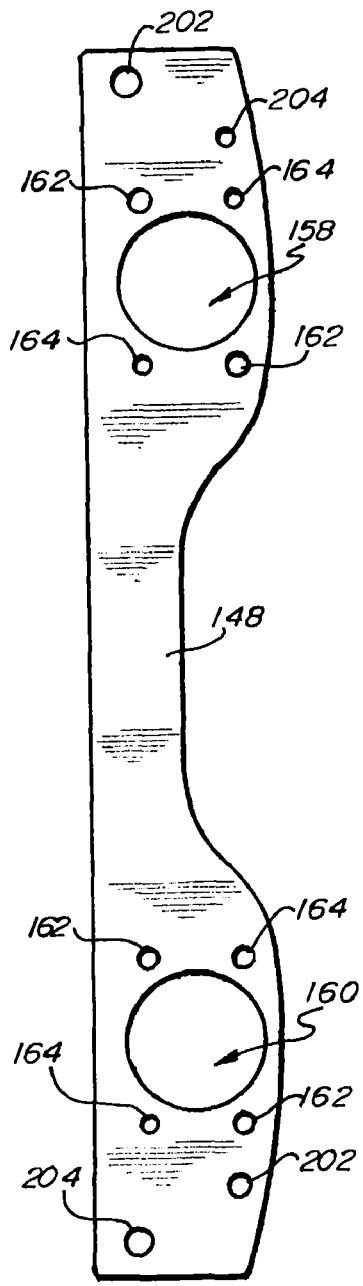
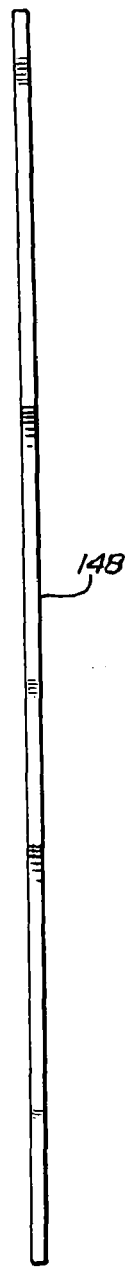
*Fig.11.*  *Fig.12.*  *Fig.13.*

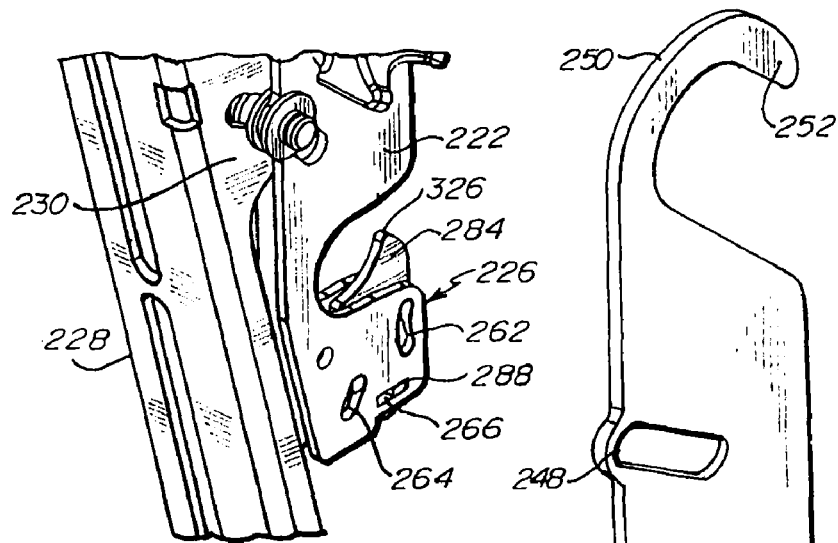
*Fig.22.*
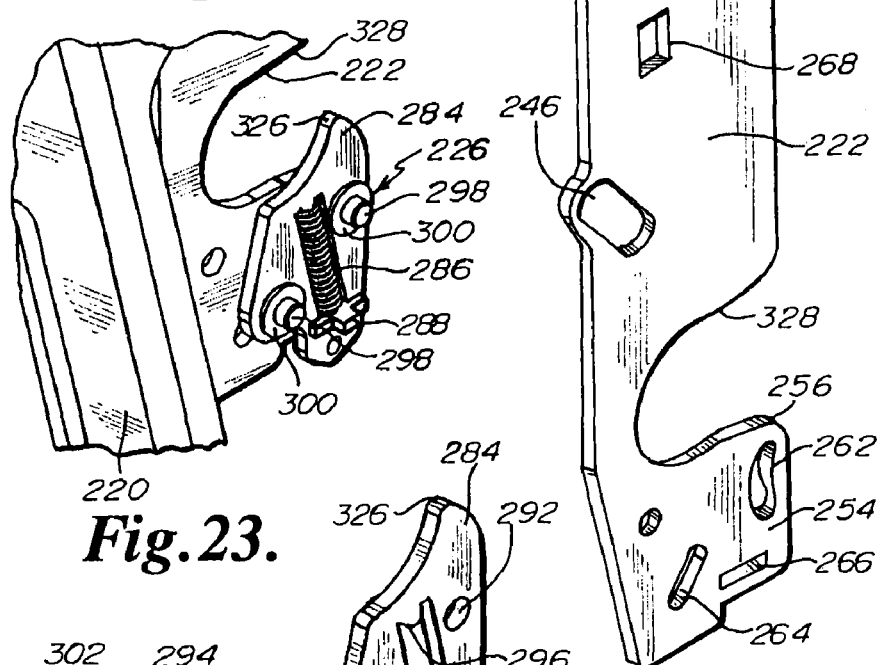
*Fig.23.*
*Fig.24.*
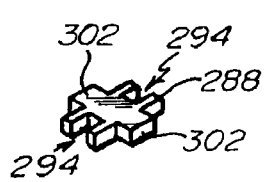
*Fig.26.*
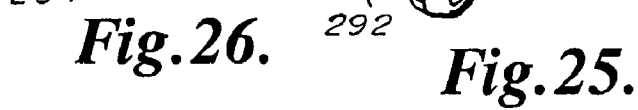
*Fig.25.*

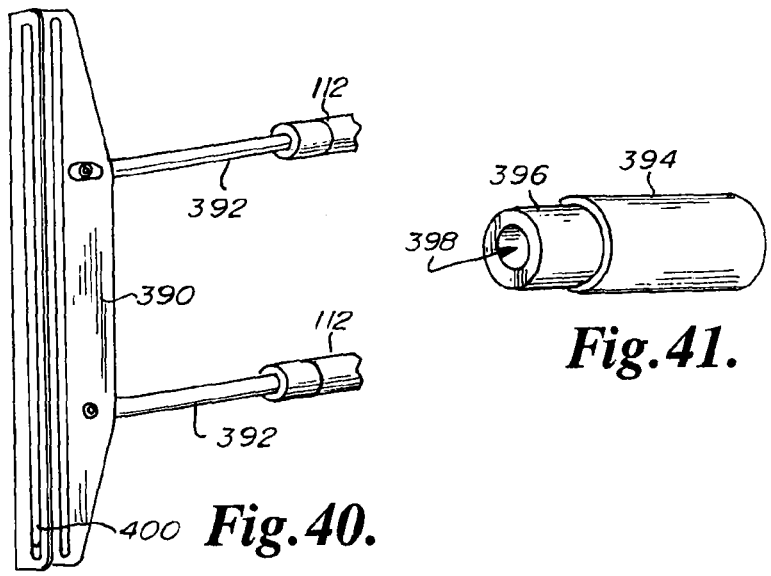
Fig.40.
Fig.41.
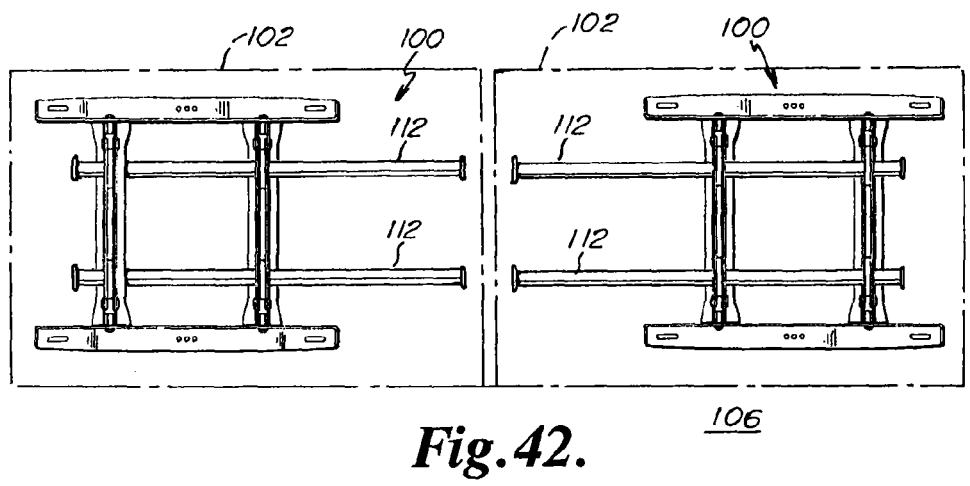
Fig.42.

DISPLAY MOUNT WITH POST-INSTALLATION ADJUSTMENT FEATURES

RELATED APPLICATIONS

This application claims the benefit of U.S. Provisional Application No. 61/019,104, entitled DISPLAY MOUNT WITH POST-INSTALLATION ADJUSTMENT FEATURES, filed Jan. 4, 2008, and further claims priority to U.S. Design Application No. 29/319,787, entitled TWO-RAIL MOUNT FOR ELECTRONIC DISPLAY, filed Jun. 15, 2008, U.S. Design Application No. 29/319,788, entitled SHELF ATTACHMENT FOR ELECTRONIC DISPLAY MOUNT, filed Jun. 15, 2008, U.S. Design Application No. 29/319,789, entitled WALL INTERFACE FOR DISPLAY MOUNT, filed Jun. 15, 2008, U.S. Design Application No. 29/319,790, entitled TILT ADJUSTABLE DISPLAY INTERFACE BRACKET, filed Jun. 15, 2008, and U.S. Design Application No. 29/319,792, entitled FIXED TWO-RAIL MOUNT FOR ELECTRONIC DISPLAY, filed Jun. 15, 2008, each of said applications hereby fully incorporated herein by reference.

FIELD OF THE INVENTION

The present invention relates generally to mounting devices for electronic displays and more particularly, to devices for mounting flat-screen electronic displays and associated peripheral devices to vertical surfaces.

BACKGROUND OF THE INVENTION

Flat-screen electronic display devices such as LCD and plasma displays are popular among consumers. A highly desirable feature that has, in large part, led to the popularity of these displays is the attractive aesthetic of a thin display device that can be mounted on a wall so as to resemble a framed photograph or painting.

Accordingly, numerous mounting devices and structures have been developed for mounting flat panel electronic displays to walls and other elements of structures. A typical drawback of these previous mounting devices, however, is that strict attention must be paid during installation of the mounting device to ensure that the display will be mounted in the optimal position on the structure and that the display will be level or aligned with the structure. Even a very small error in positioning of the mounting device during installation can result in a highly noticeable misalignment of the display when mounted, thereby detracting significantly from the aesthetics of the display installation.

Due to the location of structural elements such as wall framing members, it is often difficult to position a display mount in precisely the position desired on a wall surface. Further, fasteners used to fasten the mounting device to the wall typically lack precision and may shift during the installation process, leading to misalignment of the mounting device.

What is needed in the industry is a mounting device for electronic display devices that enables precision post-installation adjustment of mount and display device position relative to the structure upon which they are mounted.

SUMMARY OF THE INVENTION

A display mount with post-installation adjustment features according to embodiments of the present disclosure addresses the above-mentioned needs of the industry. The mount may include two or more wall brackets, each having a vertically shiftable carrier assembly. Cross-supports extend between the carrier assemblies and are received in floating connection structures in the carriers. An electronic display display is coupled with the cross-supports. The carrier assembly of each wall bracket is independently vertically shiftable to shift the orientation of the cross-supports, and thereby adjust the vertical position and orientation of the electronic display device coupled with the cross-supports. The electronic display may be coupled to the cross-supports with display interface brackets which are tilt-adjustable to change the tilt position of the display device.

According to an embodiment, a mount for attaching an electronic display to a fixed structure includes a structure interface portion with a pair of horizontally spaced apart wall brackets and a pair of elongate cross supports. Each wall bracket includes a carrier portion, the cross supports vertically spaced apart and extending between the carrier portions of the wall brackets. The carrier portion of each wall bracket is separately vertically positionable to alter the orientation of the cross supports relative to the fixed structure. The mount further includes at least one display interface bracket received on the cross supports. Each carrier portion may include a pair of floating connection structures, each floating connection structure receiving a separate one of the cross supports. The floating connection structures may be spherical bearings.

In embodiments of the invention, the cross supports are separately horizontally shiftable relative to the wall brackets. The at least one display interface bracket may include a tilt mechanism, the tilt mechanism enabling an electronic display device attached to the at least one display interface bracket to be selectively tilted about a generally horizontal tilt axis. The tilt axis may be positioned forward of a display receiving surface of the bracket such that the tilt axis extends through the electronic display device. The structure interface portion may include one or more frame members coupling the wall brackets.

In other embodiments, an electronic display system includes an electronic display device and a mount for attaching the electronic display device to a fixed structure. The mount includes a structure interface assembly and a display interface assembly, the structure interface assembly including a plurality of wall brackets and a plurality of cross supports. The wall brackets are horizontally spaced apart with each of the wall brackets including a guide structure and a carrier. The carrier is selectively vertically shiftable relative to the guide structure with a height adjustment control. The cross supports are vertically spaced apart and extend between the wall brackets. The cross supports are received in the carriers of the wall brackets such that the cross supports are vertically shiftable with the carriers. The display interface assembly includes a pair of display interface brackets spaced apart on the cross supports and the electronic display device received on the display interface brackets.

In embodiments of the invention, each carrier may include a plurality of floating connection structures, each floating connection structure receiving a separate one of the cross supports. These floating connection structures may be spherical bearings. The cross supports may be separately horizontally shiftable relative to the wall brackets.

In embodiments of the invention, each display interface bracket may include a tilt mechanism, the tilt mechanism enabling the electronic display device to be selectively tilted about a generally horizontal tilt axis. Each display interface bracket may present a display receiving surface and the tilt axis may be positioned forward of the display receiving surface such that the tilt axis extends through the electronic display device. The tilt axis can be positioned proximate a bottom edge of the electronic display device.

In other embodiments of the invention, a display system may include a plurality of electronic display devices and a plurality of mounts, each electronic display device mounted on a separate one of the mounts.

In further embodiments, a mount for attaching an electronic display to a fixed structure includes a structure interface with a pair of horizontally spaced apart wall brackets and a pair of elongate cross supports. Each wall bracket includes a carrier slidably shiftable in a guide structure, the carrier including a pair of floating connection structures. The cross supports are vertically spaced apart and extend between the carriers of the wall brackets, each cross support received in a separate one of the floating connection structures of each carrier. The mount further includes at least one display interface bracket received on the cross supports.

In other embodiments, a mount according to the invention may include a shelf assembly operably coupled with one or more of the cross supports, or a speaker attachment operably coupled with one or more of the cross supports.

BRIEF DESCRIPTION OF THE FIGURES

The invention may be more completely understood in consideration of the following detailed description of various embodiments of the invention in connection with the following drawings, in which:

FIG. 2 is a front perspective view of a wall interface of the mount depicted in FIG. 1a;

FIG. 2a is a front perspective view of an alternative embodiment of a wall interface of the mount depicted in FIG. 1a;

FIG. 3 is a perspective view of a first guide member of the wall interface of FIG. 1a;

FIG. 4 is a perspective view of another guide member of the wall interface of FIG. 1a;

FIG. 5 is partial cutaway view of the wall interface of FIG. 1a;

FIG. 6 is fragmentary cross-sectional view taken at section 6-6 of FIG. 1a;

FIG. 7 is perspective view of an end cap portion of the wall interface of FIG. 1a;

FIG. 8 is a front elevation view of the end cap of FIG. 7;

FIG. 9 is a perspective view of a coupling member of the wall interface of FIG. 1a FIG. 10 is an exploded view of a spherical bearing assembly of the wall interface of FIG. 1a;

FIG. 11 is a perspective view of a body plate of the wall interface of FIG. 1a;

FIG. 12 is a side elevation view of the body plate of FIG. 11;

FIG. 13 is a front elevation view of the body plate of FIG. 11;

FIG. 14 is a perspective view of a tilt bracket assembly of the mount of FIG. 1a;

FIG. 15 is perspective view of a display interface member of the tilt bracket assembly of FIG. 14;

FIG. 16 is a perspective view of a hook plate of the tilt bracket assembly of FIG. 14;

FIG. 17 is an elevation view of a latch plate of the tilt bracket assembly of FIG. 14;

FIG. 22 is a fragmentary perspective view of a lower latch assembly of an alternative embodiment of the tilt bracket assembly of FIG. 14;

FIG. 23 is a cut-away view of the lower latch assembly of FIG. 22;

FIG. 24 is a perspective view of the hook plate of the embodiment of FIG. 22;

FIG. 25 is a perspective view of the latch plate of the lower latch assembly of FIG. 22;

FIG. 26 is a perspective view of the spring slide of the lower latch assembly of FIG. 22;

FIG. 29 is a perspective view of a shelf attachment for the mount of FIG. 1a;

FIG. 40 is a fragmentary perspective view of a side speaker attachment;

FIG. 41 is a perspective view of an insert portion of the side speaker attachment of FIG. 40;

FIG. 42 is an elevation view of a pair of mounts according to embodiments of the invention mounted on a wall, the cross-supports of each mount being shifted to a side of the mount;

Figure 1:
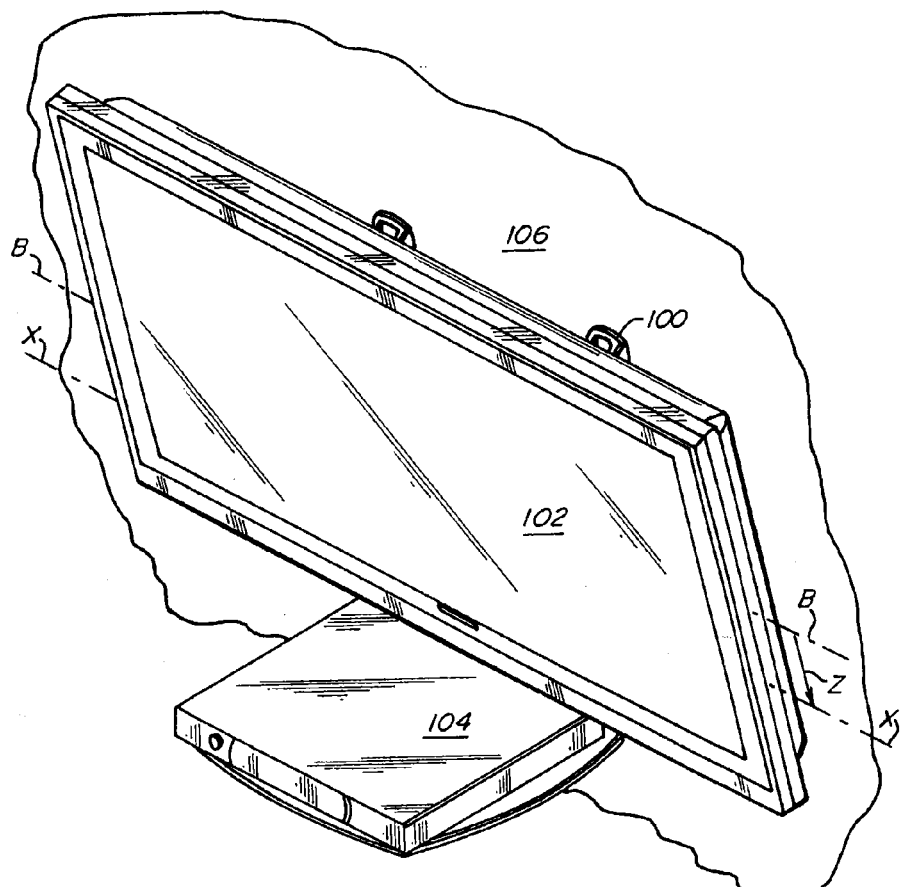
FIG. 1 is a front perspective view of an electronic display and peripheral device mounted on a wall with a mount according to an embodiment of the present invention.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE INVENTION

Figure 1A:
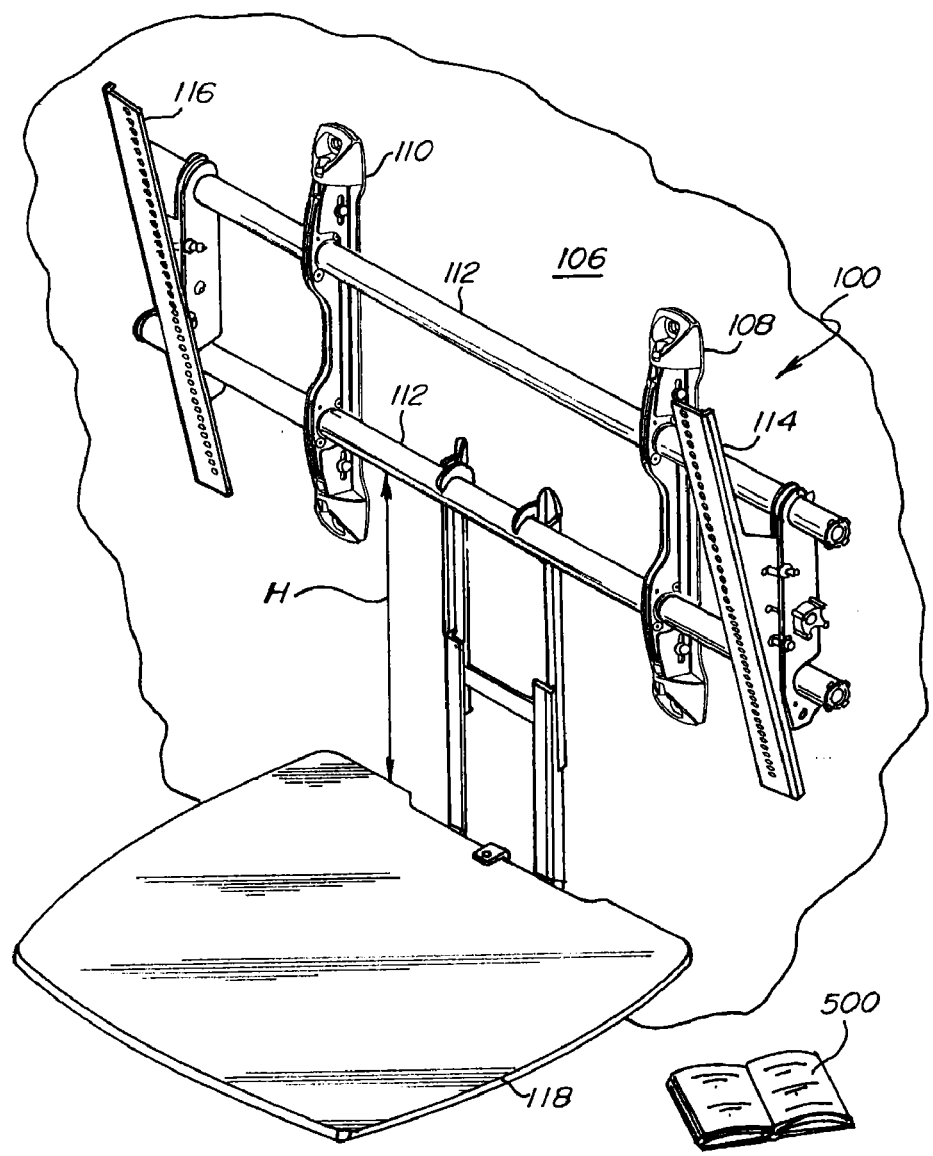
FIG. 1a is a front perspective view of a mount according to an embodiment of the present invention.
Figures 2A, 5, 6:
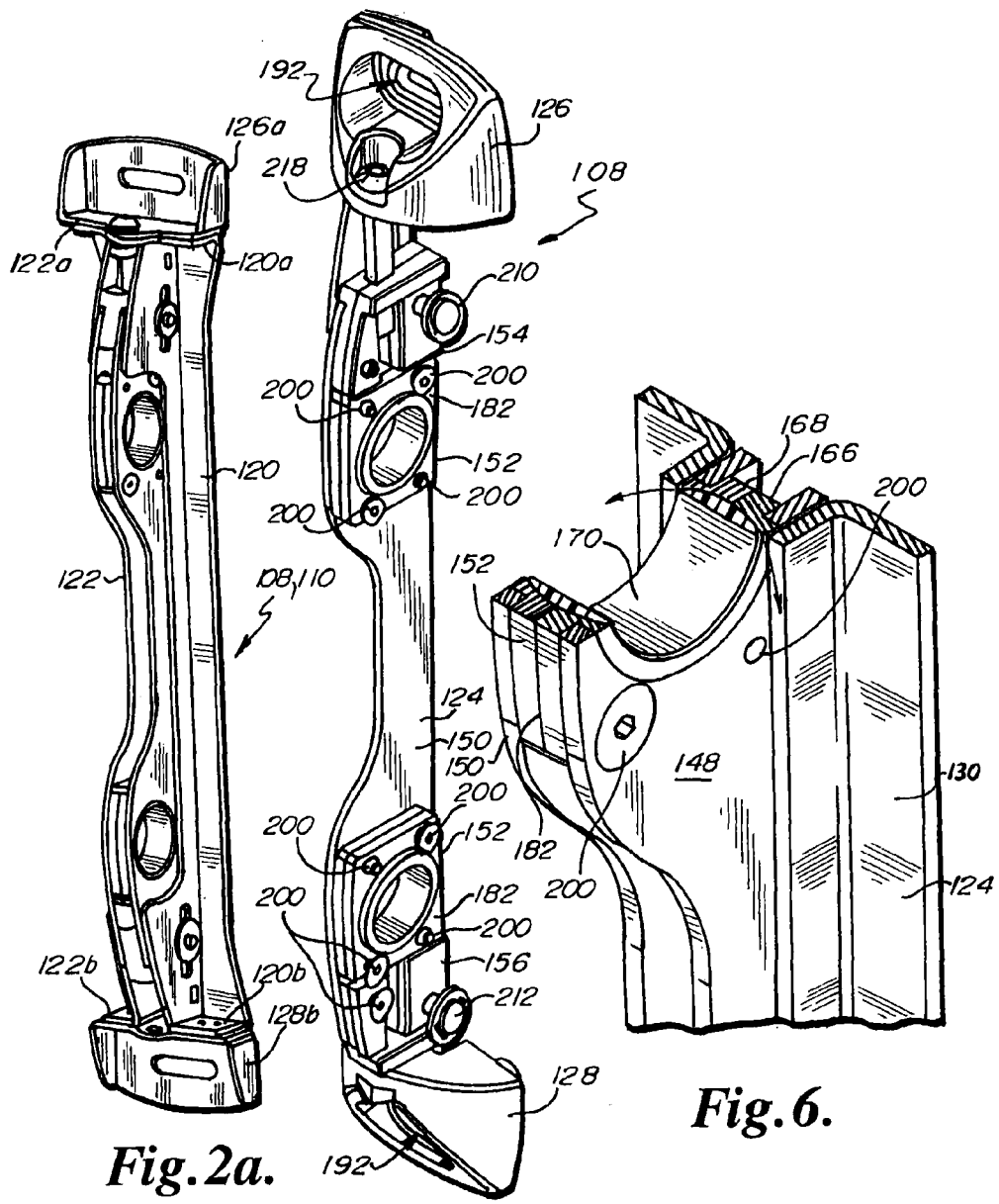

Mounting system 100 for mounting a flat panel electronic display 102, and optionally a peripheral device such as a DVD player 104, on a wall 106 is depicted generally in FIGS. 1 and 1A. Mounting system 100 generally includes wall brackets 108, 110, cross-supports 112, display interface brackets 114, 116, and shelf assembly 118.

As depicted generally in FIGS. 2-13, wall brackets 108, 110, are substantially identical and each generally includes mirror image guide members 120, 122, carrier assembly 124, and end caps 126, 128. Each guide member 120, 122, includes wall interface flange 130 with guide flange 132 projecting perpendicularly therefrom. Each wall interface flange 130 has an upper 134 and a lower 136 end portion, each defining an elongate rounded notch 138. When inwardly extending portions 140, 142, of guide member 120 are registered and mated with inwardly extending portions 140, 142, of guide member 122, the guide flanges 132 of guide members 120, 122, are spaced apart, and the rounded notches 138 of end portions 134, 136, define an elongate aperture in each. Each guide flange 132 defines a pair of elongate slots 144, 146.

Carrier assembly 124 generally includes mirror image body plates 148, 150, a pair of floating connection structures in the form of spherical bearing assemblies 152, and coupling members 154, 156. Each body plate 148, 150, defines a pair of cross-support apertures 158, 160, surrounded by fastener holes 162, 164. Spherical bearing assembly 152 generally includes mirror image housing halves 166, 168, and bearing 170. Each housing half 166, 168, defines aperture 172 having an inwardly oriented spherical inner surface 174 conforming to outer surface 176 of bearing 170. Housing halves 166, 168, are mated, with inner surface 178 of housing half 166 confronting inner surface 180 of housing half 168 and apertures 172 registered to define housing 182. Bearing 170 is captured in apertures 172 with outer surface 176 confronting inner surfaces 174. Coupling members 154, 156, each generally include end flange 184 defining threaded aperture 186, and projecting legs 188, 190. End caps 126, 128, each define a horizontally oriented elongate aperture 192 and a vertically oriented aperture 194.

Coupling members 154, 156, are received between ends 196, 198, respectively of body plates 148, 150. Spherical bearing assemblies 152 are also received between body plates 148, 150, the bearing 170 of each registered with one of cross-support apertures 158, 160. Fasteners 200 extend through fastener holes 162, 164, 202, 204, and corresponding fastener holes 206 in housing halves 166, 168, and fastener holes 208 in coupling members 154, 156, from each side of carrier assembly 124 to secure the assembly together.

Carrier assembly 124 is received between guide flanges 132 of guide members 120, 122, as depicted in FIG. 2. Guide pins 210, 212, respectively extend through elongate slots 144, 146, and apertures 214 in end caps 126, 128. Carrier assembly 124 is thus vertically slidable between guide members 120, 122, guided by guide pins 210, 212, in slots 144, 146.

Figure 44:
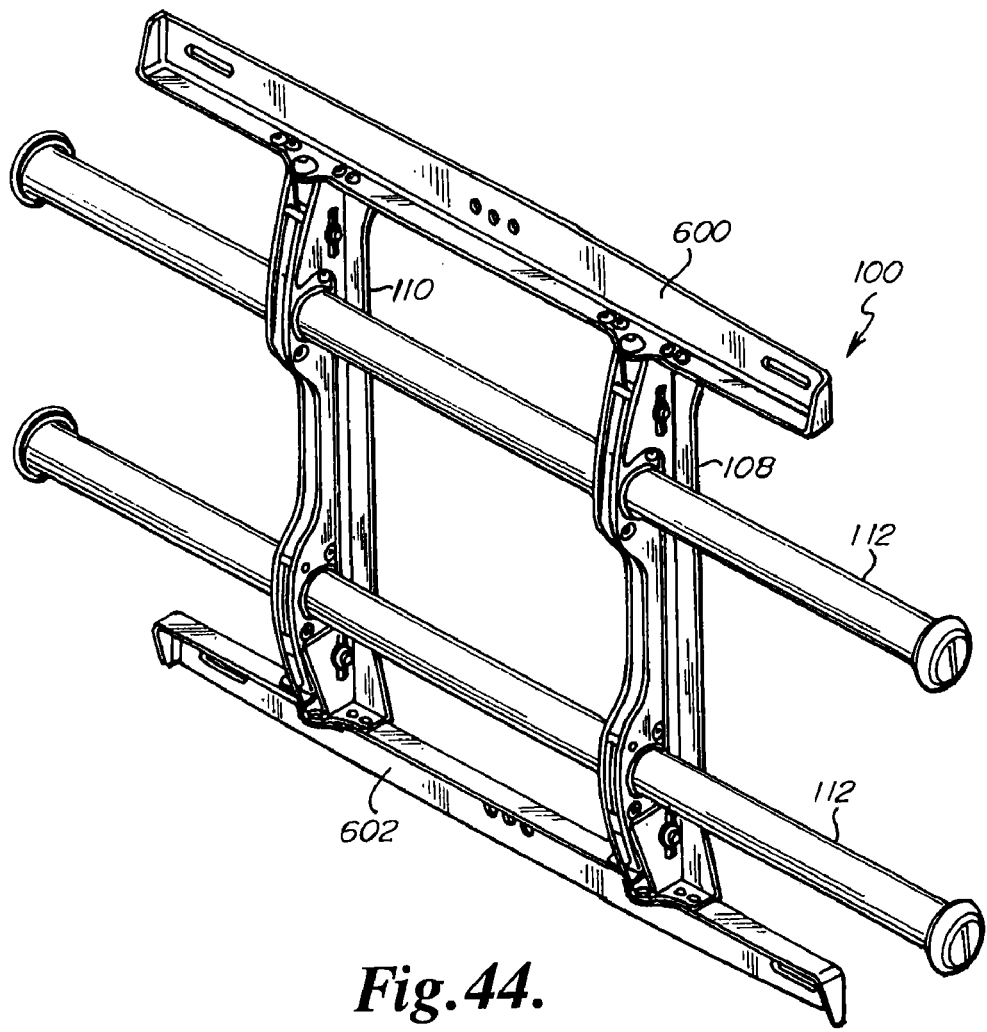
FIG. 44 is a front perspective view of an alternative embodiment of a mounting system according to the invention.

End caps 126, 128, are received on upper and lower end portions 134, 136, of guide members 120, 122, and are secured in place with fasteners (not depicted) extending through apertures 216. A height adjustment control in the form of vertical position adjustment screw 218 extends through vertically oriented aperture 194 in end cap 126 and threads into threaded aperture 186. As vertical position adjustment screw 218 is rotated, carrier assembly 124 slides between guide members 120, 122. In an alternative embodiment depicted in FIG. 2a, guide members 120, 122, have end flanges 120a, 120b, 122a, 122b, respectively, and are connected with end connectors 126a, 128a, respectively. Cosmetic caps (not depicted) may be fitted over end connectors 126a, 128b, for aesthetic purposes if desired. In another alternative embodiment depicted in FIG. 44, wall brackets 108, 110, are coupled in a single unit with upper and lower frame members 600, 602, respectively.

Mirror image display interface brackets 114, 116, are generally depicted in FIGS. 14-26, each generally including display interface member 220, hook plates 222, and optionally one or both of upper latch assembly 224, and lower latch assembly 226. Display interface member 220 generally includes display interface channel portion 228 with guide flange portion 230 extending perpendicularly thereto. Display interface channel portion defines a plurality of apertures, some of which may be rounded 232, and some of which may be elongate 234, for receiving fasteners to attach flat panel electronic display 102 on display receiving surface 236. Guide flange portion 230 defines guide structures 237 in the form of slots 238, 240. Although depicted as slots, it will be appreciated that guide structures 237 may also be configured as other structures fulfilling the same purpose, such as for example, channels, grooves, recesses, ridges, cam surfaces, or the like. Further, it will be appreciated that guide structures 237 may be arcuate, angular, or straight in shape. Guide flange portion 230 further defines friction slot 242.

Figures 14, 15, 16, 17:
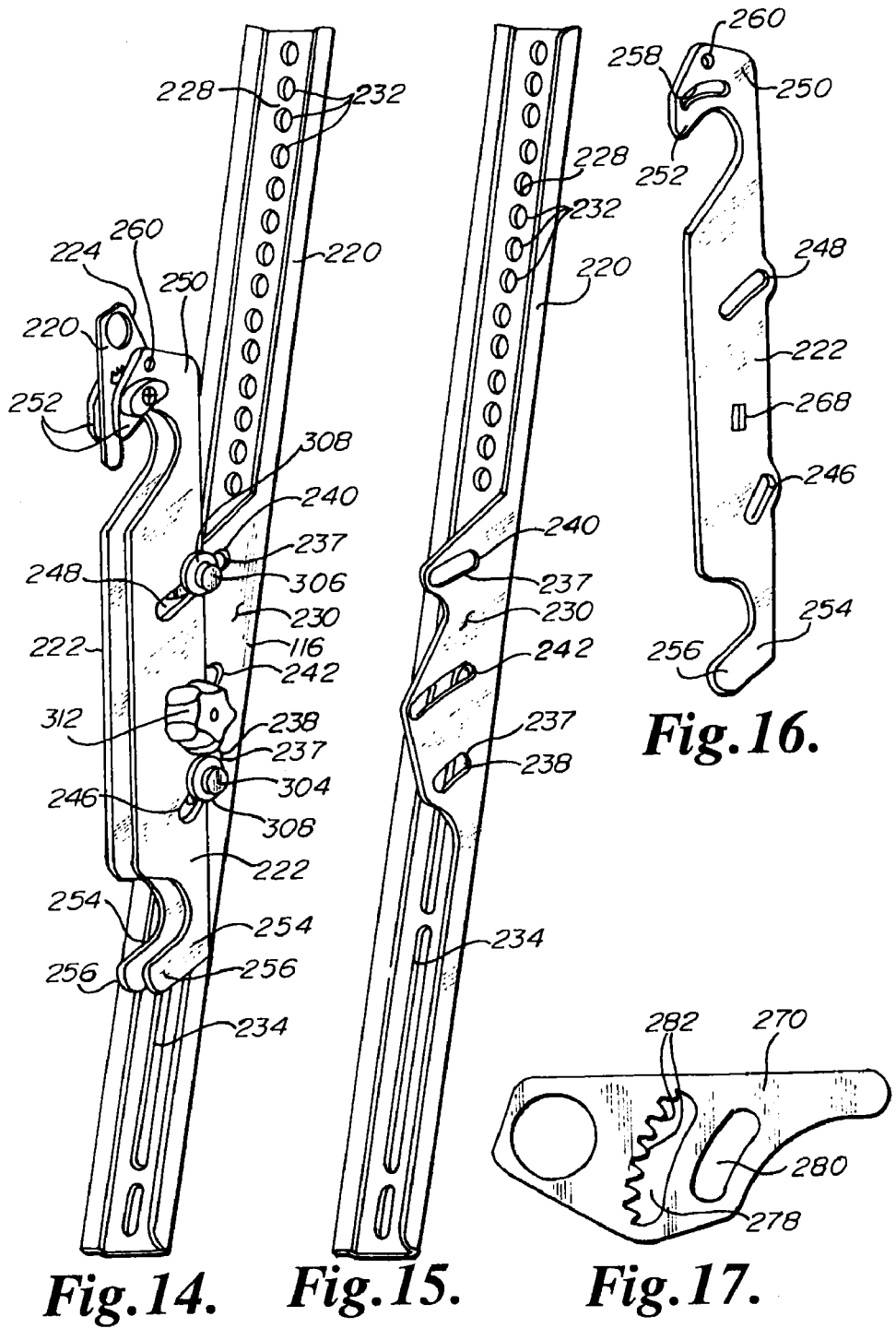
Figures 20, 21:
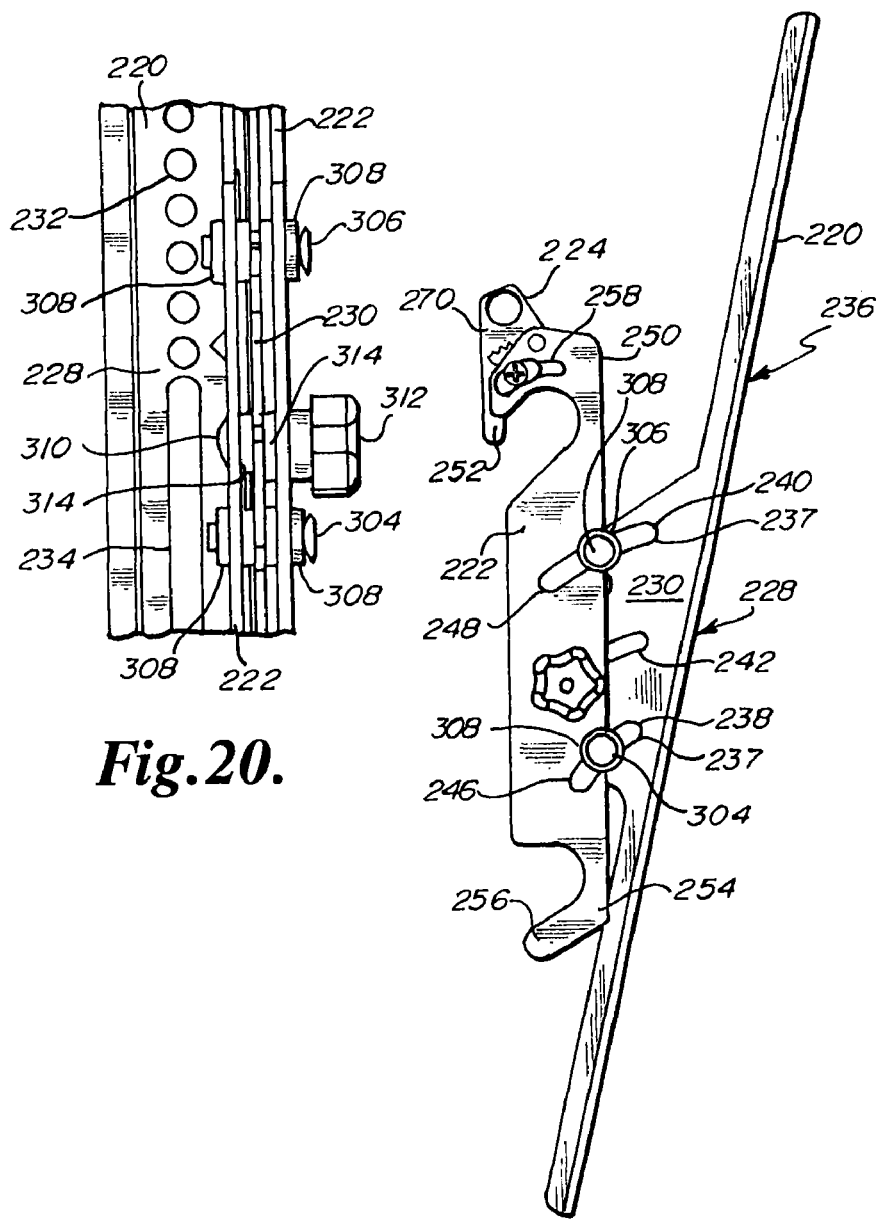
FIG. 20 is a fragmentary rear elevation view of a portion of the tilt bracket assembly of FIG. 14.
FIG. 21 is a side elevation view of the tilt bracket assembly of FIG. 14.

Each hook plate 222 defines guide structures 244, configured as slots 246, 248. Upper end 250 defines upper hook 252, while lower end 254 defines lower hook 256. Again, although depicted as slots, it will be appreciated that guide structures 244 may also be configured as other structures fulfilling the same purpose, such as for example, channels, grooves, recesses, ridges, cam surfaces, or the like. Further, it will be appreciated that guide structures 244 may be arcuate, angular, or straight in shape. As depicted in FIGS. 14, 16, and 21, upper end 250 may further define latch guide slot 258 and latch adjustment aperture 260. As depicted in FIGS. 22-26, lower end 254 may further define latch guides 262, 264, and spring pin guide 266. Friction screw aperture 268 extends through hook plate 222 intermediate slots 246, 248.

Figure 18:
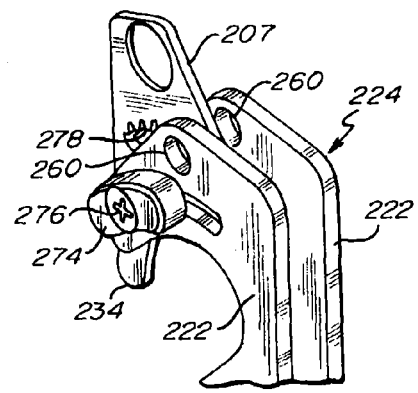
FIG. 18 is a fragmentary perspective view of an upper latch assembly of the tilt bracket assembly of FIG. 14.
Figure 19:
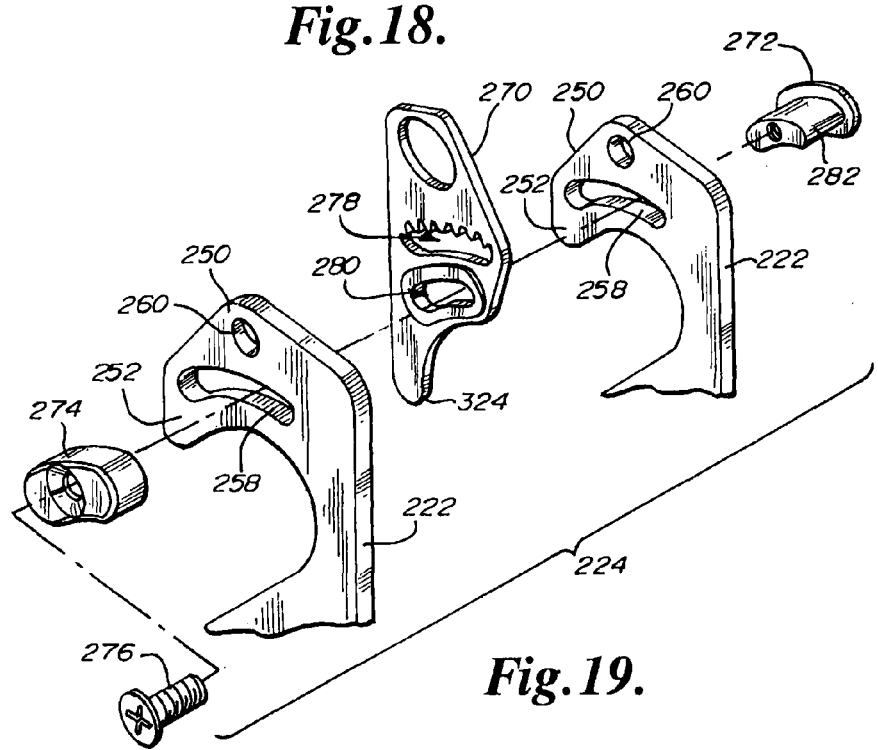
FIG. 19 is an exploded view of the upper latch assembly of FIG. 18.

As depicted in FIGS. 18 and 19, upper latch assembly 224 generally includes latch plate 270, guide 272, guide retainer 274, and fastener 276. Latch plate 270 defines geared aperture 278 and guide slot 280. Shank portion 282 of guide 272 extends through latch guide slots 258 of both hook plates 222 and guide slot 280 of latch plate 270. Guide 272 is retained with guide retainer 274 and fastener 276. Geared aperture 278 is registered with latch adjustment aperture 260 of each hook plate 222. Teeth 282 in geared aperture 278 may be configured to mesh with the tip of a standard Phillips screwdriver.

Lower latch assembly 226 as depicted in FIGS. 22-26 generally includes latch plate 284, spring 286, and spring slide 288. Latch plate 284 defines spring aperture 290 and guide pin apertures 292. Spring slide 288 is received in spring aperture 290 with notches 294 engaged with opposite sides.

One end of spring 286 is received over tab 296 with the opposite end bearing on spring slide 288. Guide pins 298 are received in each of apertures 292 and are retained in position with retainers 300. Latch plate 284 is received between lower ends 254 of hook plates 222, with lateral ends 302 of spring slide 288 projecting through spring pin guides 266, and the outer ends of guide pins 298 received in latch guides 262, 264.

Guide pin 304 extends through slot 238 and the guide slots 246 of both hook plates 222, while guide pin 306 extends through slot 240 and guide slots 248 of both hook plates 222. Each guide pin 304, 306, is retained on each side with a retainer 308. Friction screw 310 extends through friction slot 242 and friction screw aperture 268 in each of hook plates 222 and is secured with knob 312. Friction washers 314 are positioned on each side between guide flange portion 230 and hook plate 222.

Figure 28:
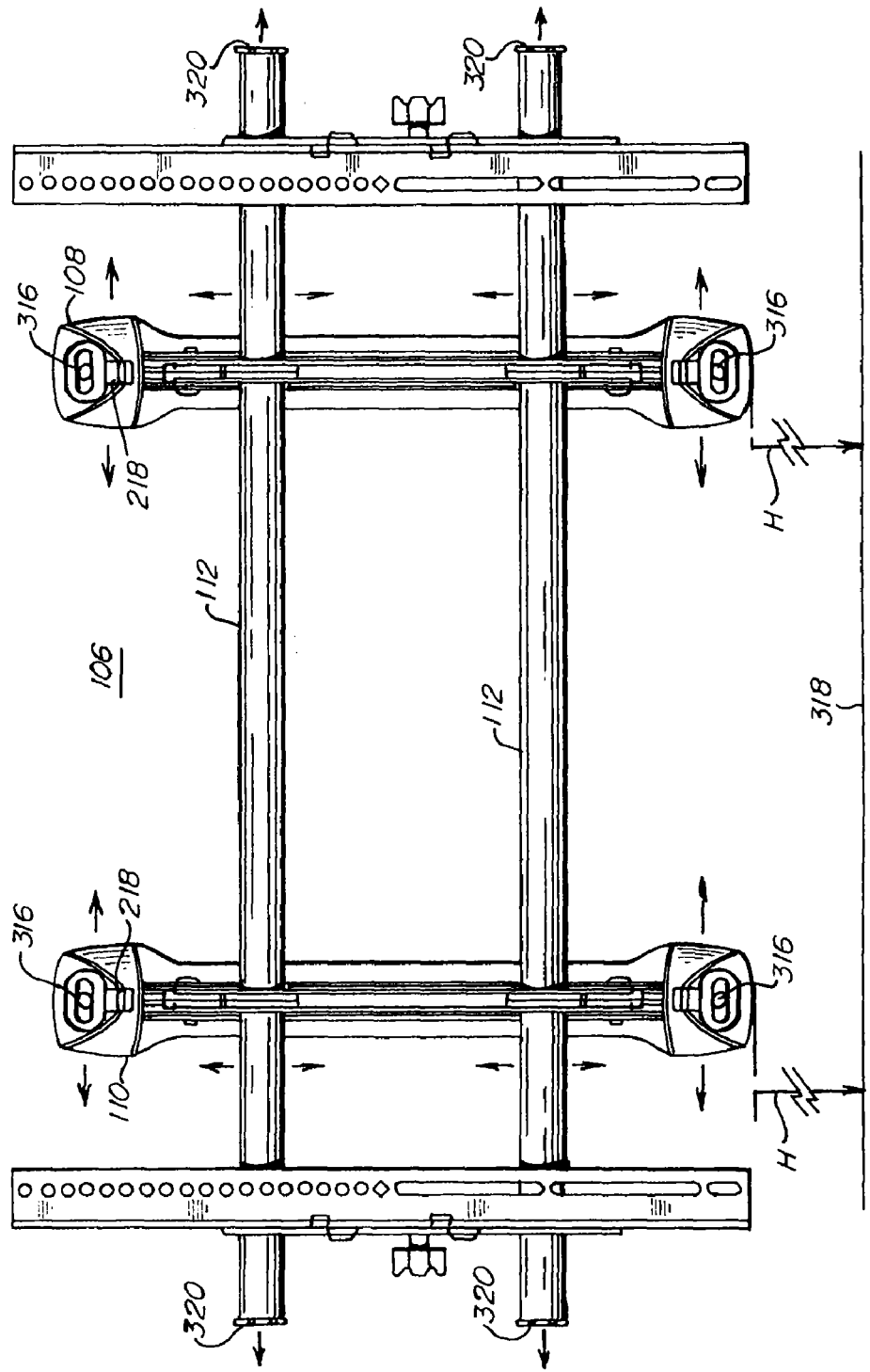
FIG. 28 is a front elevation view of a mount according to an embodiment of the invention.

During installation, wall brackets 108, 110, are mounted at a desired position on wall 106 with fasteners 316 through elongate apertures 192 in end caps 126, 128, as depicted in FIG. 28, preferably into a load bearing member of wall 106 such as a stud. Wall brackets 108, 110, are preferably mounted at substantially the same height H from floor 318 so as to minimize the amount of adjustment needed. It will be appreciated that elongate apertures 192 enable the top and bottom of each of wall brackets 108, 110, to be shifted laterally before fasteners 316 are tightened in order to ensure proper vertical alignment.

Once fasteners 316 are tightened, cross-supports 112 may be inserted through the horizontally registered spherical bearings of the wall brackets 108, 110. Cross-supports 112 are freely slidable through bearings 170. If not initially registered, horizontally corresponding bearings 170 of wall brackets 108, 110, can be brought into registry by operating vertical position adjustment screws 218 on one or both of wall brackets 108, 110, thereby causing carrier assemblies 124 to move vertically. With cross-supports 112 in place, vertical position adjustment screws 218 can also be operated so as to raise or lower the height of cross-supports 112 above floor 318, to level cross-supports 112, or to otherwise adjust the orientation of cross-supports 112 relative to other structures in the room such as corners or furniture. In embodiments of the invention, the carrier assembly 124 of each wall bracket 108, 110, is independently capable of between ½ to 2 inches of vertical travel. Spherical bearing assemblies 152 enable cross-supports 112 to be oriented out of perpendicular with the carrier assemblies 124, thereby enabling independent shifting of carrier assemblies 124 without binding.

Figure 43A:
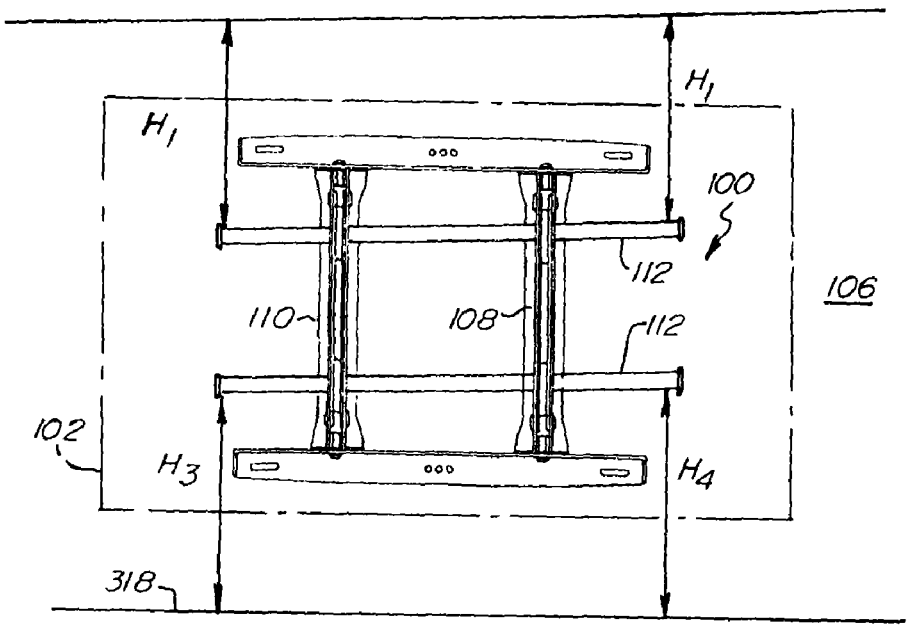
FIG. 43a is an elevation view of a mount according to an embodiment of the invention mounted on the wall of a room wherein the ceiling is not parallel with the floor and the cross supports of the mount have been adjusted to parallel the ceiling.
Figure 43B:
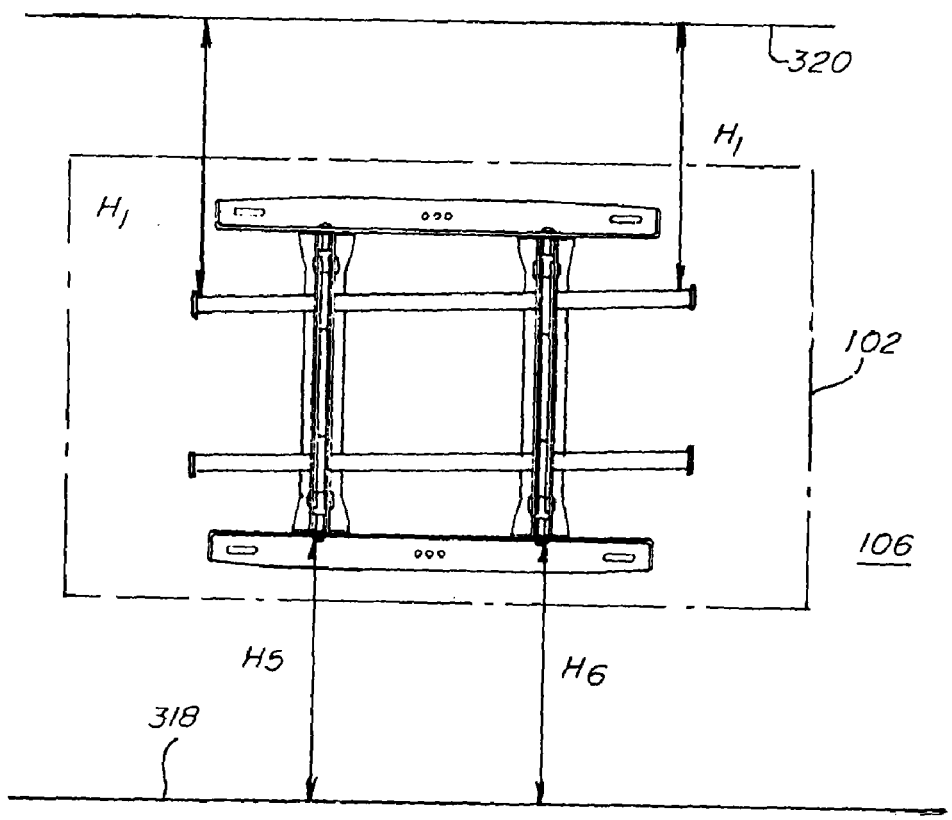
FIG. 43b is an elevation view of a mount according to an embodiment of the invention mounted on the wall of a room wherein the mount is slightly skewed and the cross supports of the mount have been adjusted to parallel the ceiling and floor of the room.

For example, as depicted in FIG. 43a, cross-supports 112 may be adjusted to parallel a ceiling 320 that is not parallel with floor 318. As depicted, the ends of upper cross-support 112 are both the same distance $H_1$ below ceiling 320, while the ends of lower cross-support 112, which is parallel with the upper cross-support, are at differing distances $H_3$, $H_4$, above floor 318. When an electronic display 102 is coupled with cross supports 112, the top and bottom edges of the electronic display 102 will be parallel with ceiling 320. In another example depicted in FIG. 43b, mount 100 may be installed such that wall brackets 108, 110, are skewed or at differing distances $H_5$, $H_6$, above floor 318. Carrier assembly 124 of each wall bracket 108, 110, can be independently adjusted so that the ends of cross supports 112 are located a uniform distance from ceiling 320 or floor 318. When an electronic display 102 is coupled with cross-supports 112, the top and bottom edges of the electronic display 102 will be parallel with ceiling 320 and floor 318.

With cross-supports 112 inserted through bearings 170 of wall brackets 108, 110, end caps 320 may be inserted in each end of cross-supports 112 to prevent cross-supports 112 from being withdrawn. In embodiments of the invention, cross-supports 112 are laterally slidable within bearings 170 even with end caps 320 in place so as to enable a wider range of lateral positioning relative to wall brackets 108, 110. For example, as depicted in FIG. 42, cross-supports 112 may be shifted to one side or the other, such that mount 100 can be located wherever necessary on wall 106 to ensure fastening to studs or other support structure within wall 106. As also depicted in FIG. 42, the ability to laterally shift cross-supports 112 may also facilitate the assemblage of multi display arrays of electronic display devices 102. Displays 102 can be positioned relative to each other without the necessity of ensuring uniform lateral spacing of mounts 100.

Display interface brackets 114, 116, may be then attached to the back of display 102 with fasteners through apertures 232, 234. The plurality of round apertures 232 and the elongate apertures 234 enable brackets 114, 116, to be attached at a variety of vertical positions on the back of display 102.

Display 102 with display interface brackets 114, 116, attached may then be coupled with cross-supports 112 by hooking upper hook 252 of each bracket 114, 116, over the top cross-support 112 and lower hook 256 of each bracket 114, 116 over the bottom cross-support 112. If brackets 114, 116, are equipped with upper latch assembly 224, the latch assembly 224 may be engaged by inserting a Phillips screwdriver through aperture 260, engaging the tip of the screwdriver with teeth 282, and rotating the screwdriver. As the screwdriver rotates, guide 272 slides in guide slots 258 and tip 324 of latch plate 270 is urged around cross-support 112 to close the latch. Disengagement is the reverse of engagement If brackets 114, 116, are equipped with lower latch assembly 226, tip 326 of latch plate 284 encounters bottom cross-support 112 as lower hook 256 is engaged. Latch plate 284 rotates against the bias provided by spring 286 with pins 298 sliding in guides 262, 264, and spring slide 288 sliding in guides 266. Once sufficient clearance exists between tip 326 and upper edge 328 of lower hook 256 to enable passage of cross-support 112, the bias of spring 286 urges latch plate 284 to snap back into position with lower hook 256 engaged around cross-support 112. Disengagement is accomplished by pulling outward on the bottom of display 102 with sufficient force to overcome the bias of spring 286, thereby causing latch plate 284 to rotate in the opposite direction.

Figure 27:
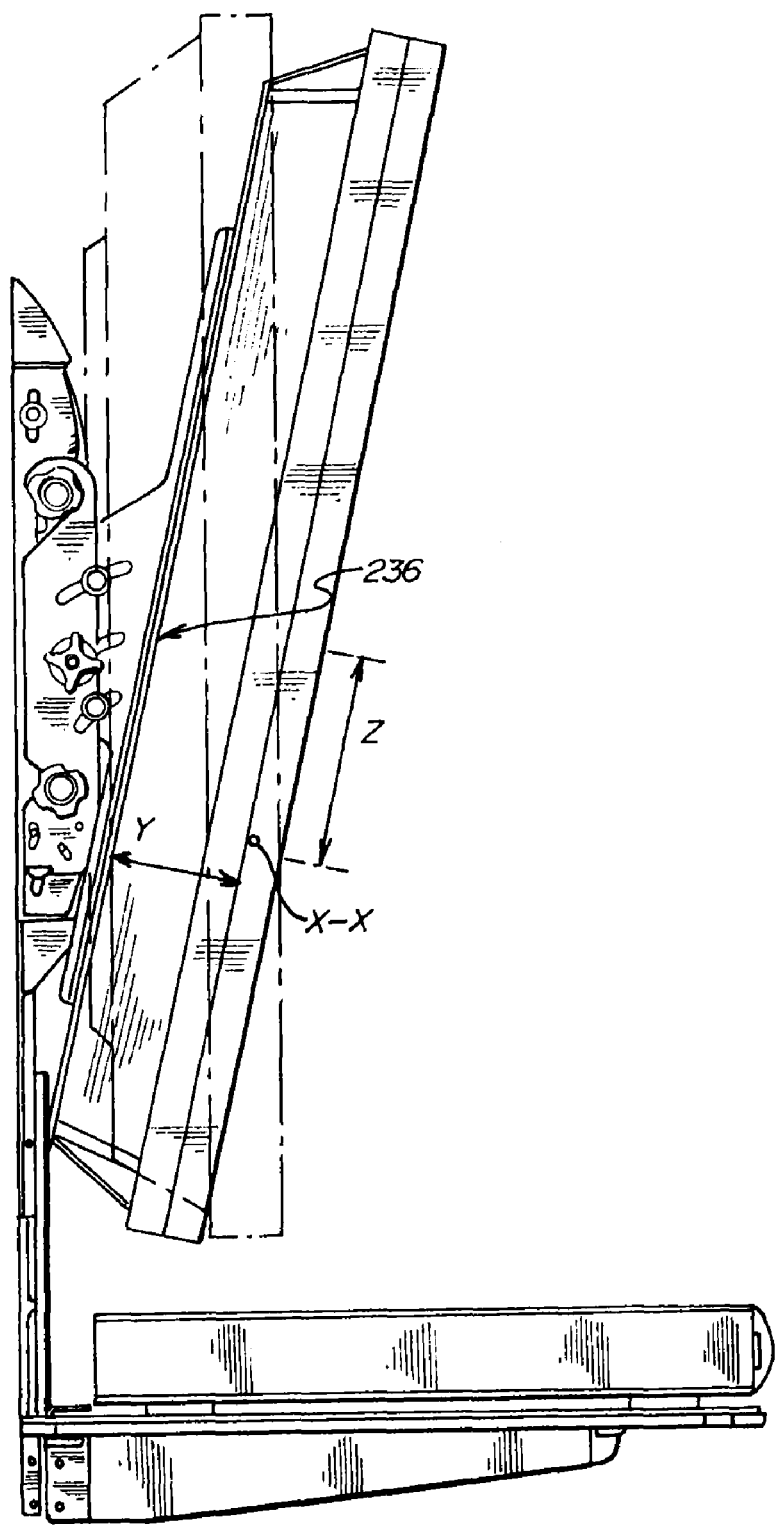
FIG. 27 is a side elevation view of a mount and display according to an embodiment of the present invention depicting the tilt motion of the mount.

With display 102 coupled to cross-supports 112, the tilt position of the display may then be adjusted as depicted in FIG. 27. With knob 312 loosened so as to reduce friction, display 102 may be tilted to a desired position by pulling the top of the display away, or pushing the top of the display toward, wall 106. Guide pin 304 slides or rolls in slot 238 and the guide slots 246 of both hook plates 222, while guide pin 306 slides or rolls in slot 240 and guide slots 248 of both hook plates 222 to enable tilting. Because of the orientation of slots 238, 240, and guide slots 246, 248, display 102 pivots about a horizontal pivot axis X-X extending through the display 102 forward a distance Y of the display receiving surface 236 and down a distance Z from a horizontal midline B-B of the display 102. With this configuration, display 102 is tiltable in either direction with a minimum of effort and tends to remain in position even with knob 312 loose. Once a desired tilt position is reached, however, knobs 312 may be tightened to apply frictional resistance to hold display 102 in the tilt position. Further teachings relating to the optimal orientation of guide slots 238, 240, may be found in PCT Application No. PCT/US2008/000117, hereby fully incorporated herein by reference.

Figure 29:
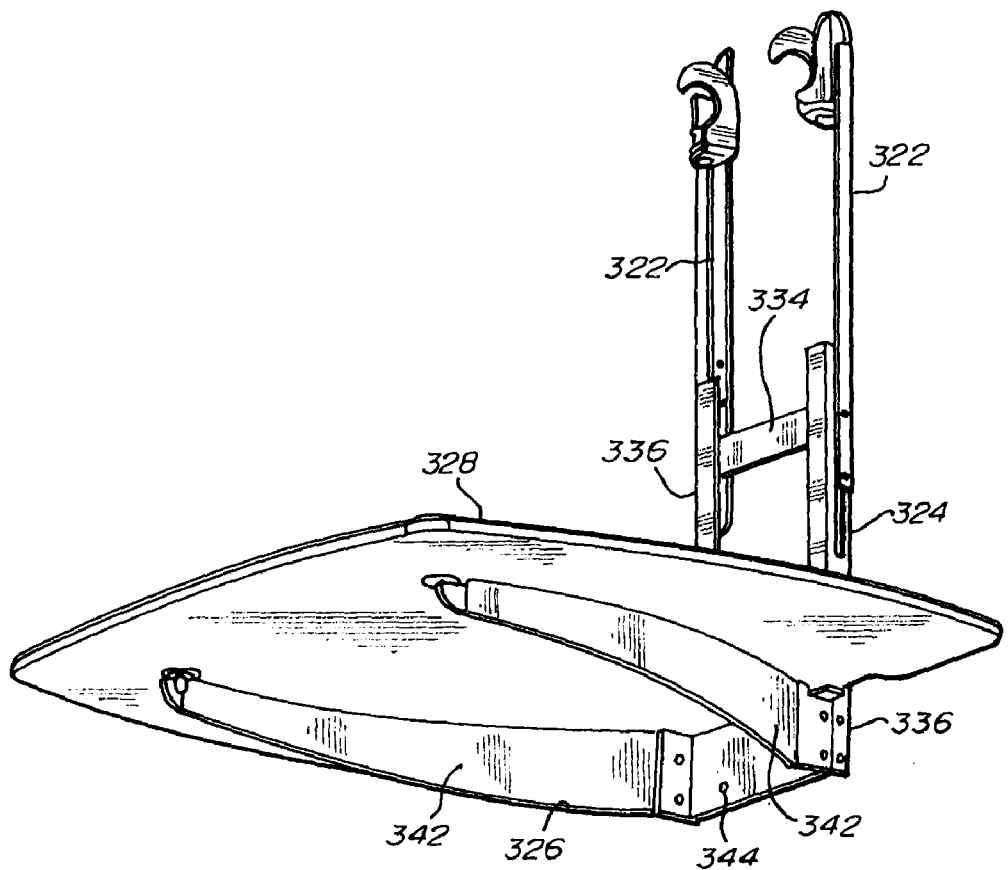
Figure 30:
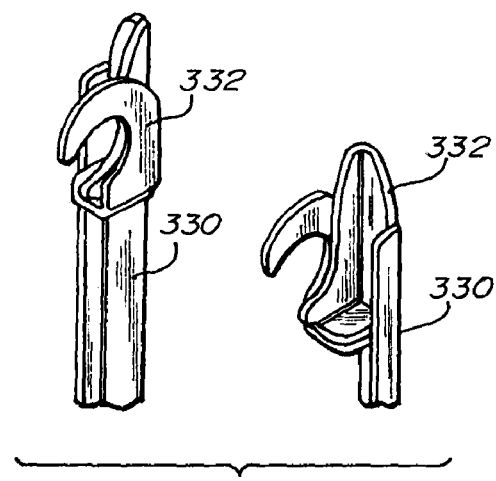
FIG. 30 is a fragmentary perspective view of the hook assemblies of the shelf attachment of FIG. 29.
Figure 31:
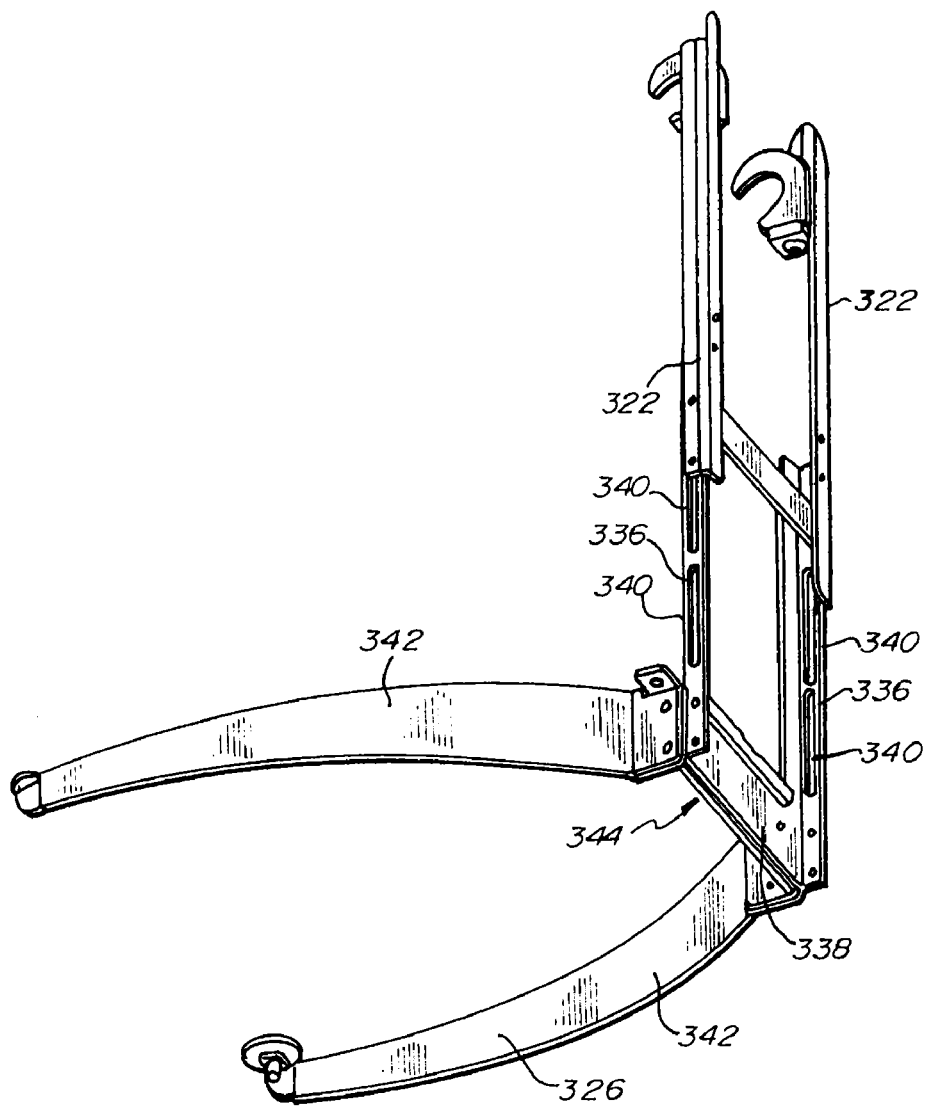
FIG. 31 is a bottom perspective view of the shelf assembly of FIG. 29 without the shelf.

Shelf assembly 118 is depicted in FIGS. 29-31 and generally includes hook assemblies 322, slide 324, shelf support 326 and shelf 328. Hook assembly 322 generally includes uprights 330, hook portion 332 and cross-member 334. Slide 324 generally includes channels 336 and cross-member 338. Each of channels 336 defines a plurality of elongate apertures 340. Shelf support 326 generally includes lateral members 342 and back plane 344.

As depicted in FIG. 1a, hook portion 332 hooks over cross-support 112 to suspend shelf assembly 118 from the mount. Uprights 330 are coupled to slide 324 with fasteners extending through elongate apertures 340. With these fasteners loosened, uprights 330 are slidable relative to slide 324 to adjust height H1 of cross-member 112 above shelf 328. Shelf 328 may be made from transparent material such as glass, or from opaque materials, depending on the aesthetic effects desired.

Figure 36:
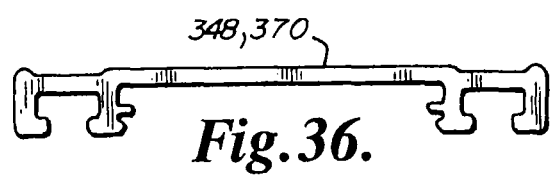
FIG. 36 is an end view of the extrusion portion of the accessory attachment of FIG. 35.
Figure 35:
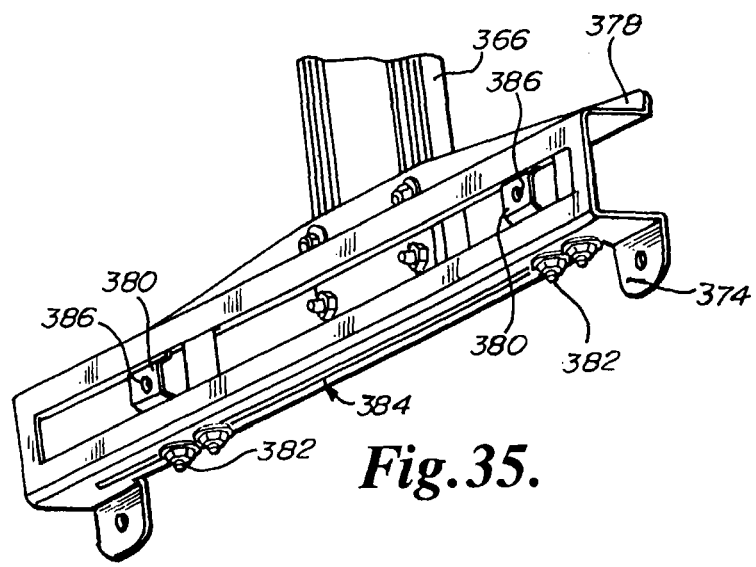
FIG. 35 is a front perspective view of the accessory attachment depicted in FIG. 32.
Figure 37:
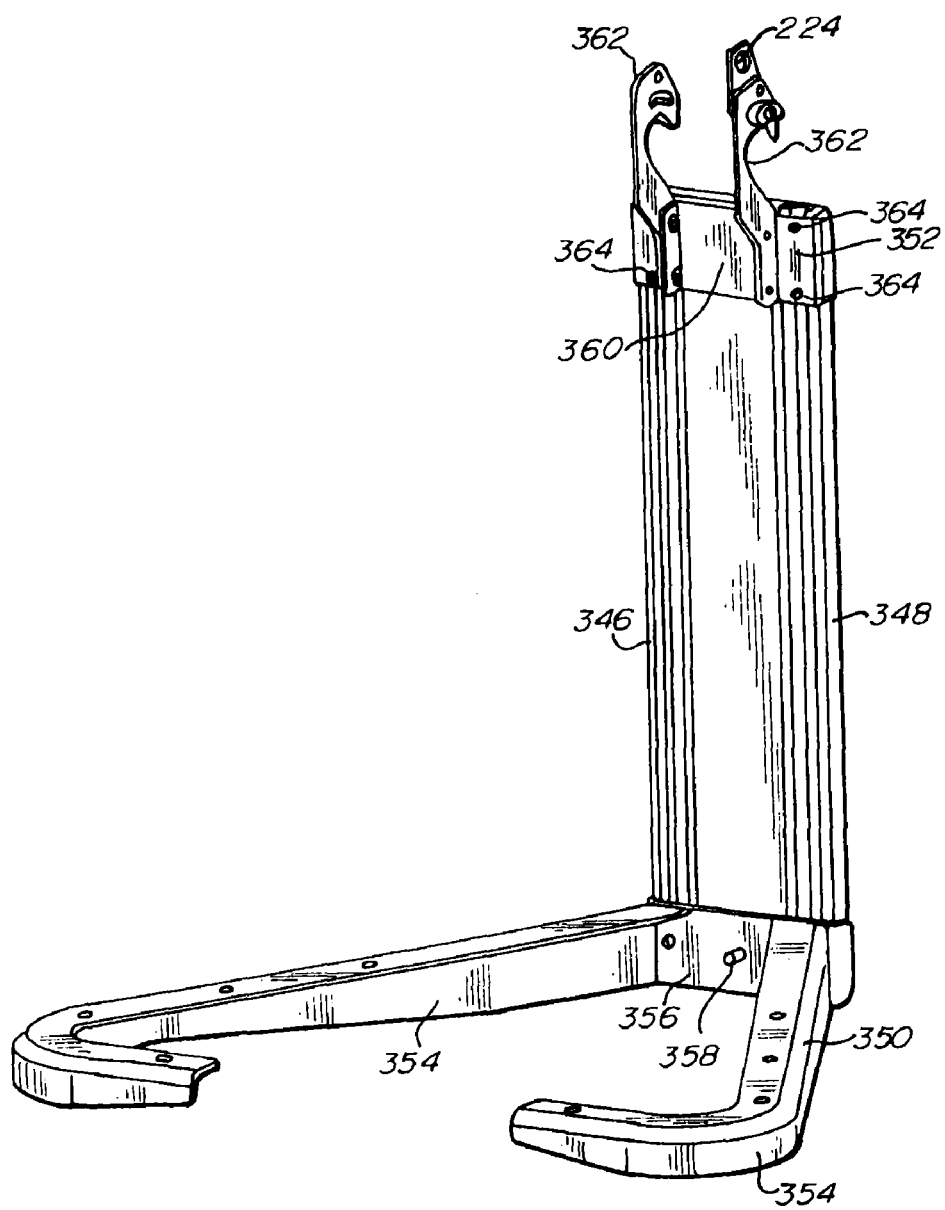
FIG. 37 is a perspective view of an alternative embodiment of a shelf attachment.
Figure 38:
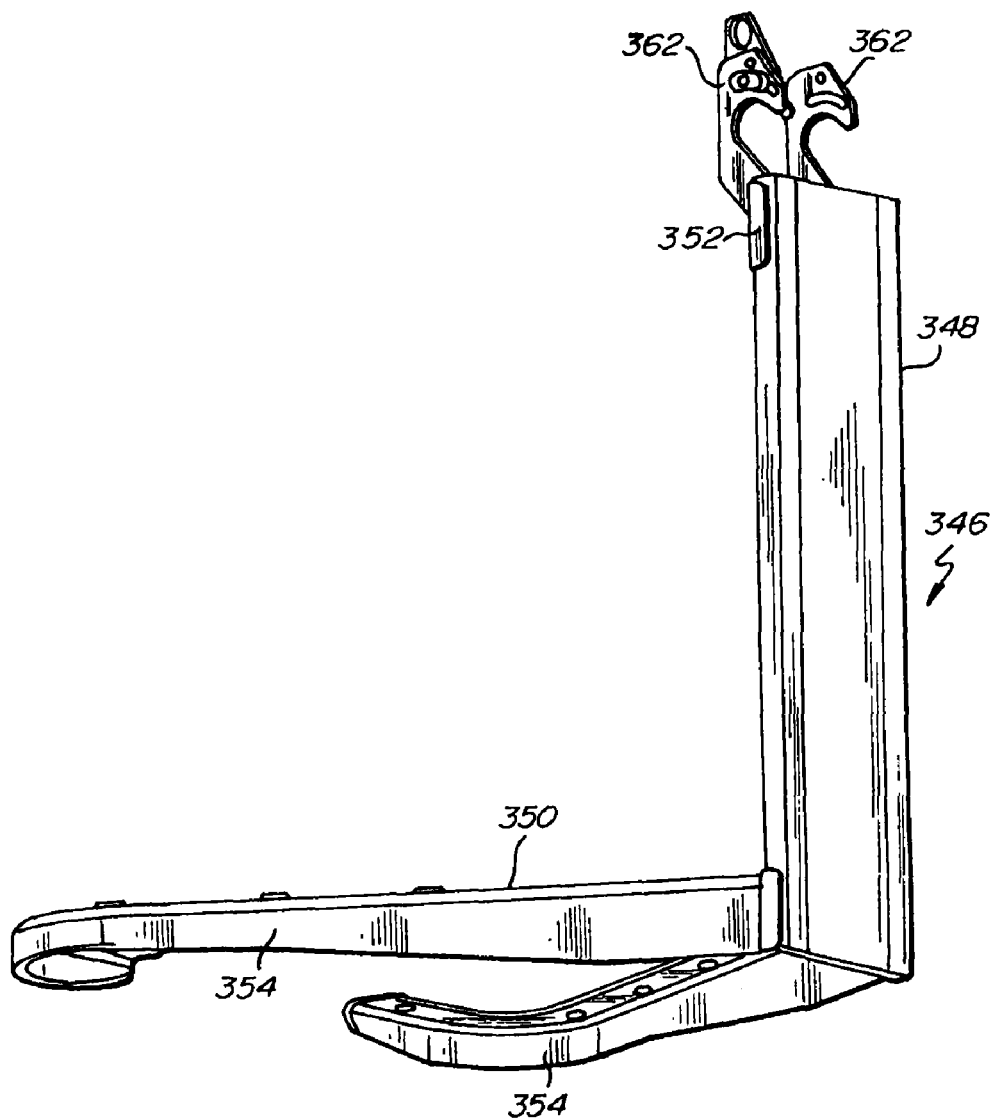
FIG. 38 is a rear perspective view of the shelf attachment of FIG. 37.

An alternative embodiment of a shelf assembly 346 is depicted in FIGS. 37-38. Shelf assembly 346 generally includes extrusion 348, shelf support 350 and hook assembly 352. Extrusion 348 may be, for example, an aluminum extrusion having a cross-section as depicted in FIG. 36. Shelf support 350 generally includes a pair of channels 354 connected with a back plane coupler 356. Shelf support 350 is attached to extrusion 348 with fastener 358. Hook assembly 352 generally includes coupler 360 and hooks 362. Hooks 362 may be equipped with a latch assembly similar to previously described upper latch assembly 224. Hook assembly 352 is attached to extrusion 348 with fasteners 364. It will be appreciated that hook assembly 352 may be attached at any desired location along extrusion 348 in order to adjust the position of a shelf resting on shelf support 350 relative to cross-supports 112. In use, hooks 362 are engaged over cross-support 112 in a similar fashion as for the hooks of shelf assembly 118 as previously described.

Figure 32:
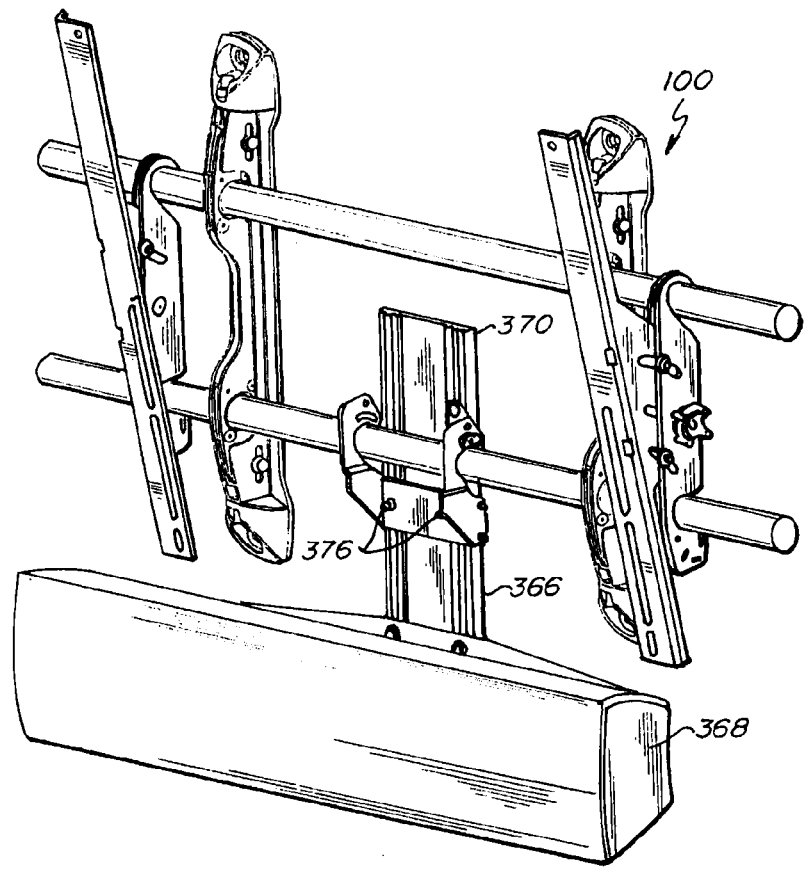
FIG. 32 is a front perspective view of a mount and accessory attachment according to an embodiment of the invention.
Figure 33:
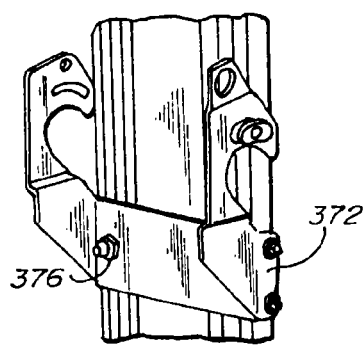
FIG. 33 is a fragmentary view of a portion of the mount of FIG. 32.
Figure 34:
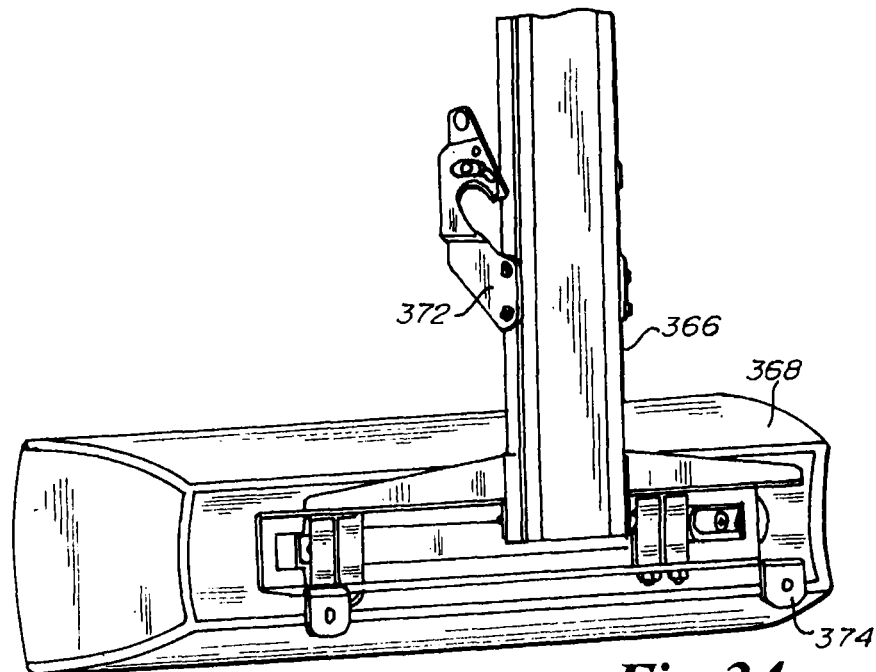
FIG. 34 is a rear perspective view of the accessory attachment depicted in FIG. 32.

Accessory attachment 366 as depicted in FIGS. 32-36 may be used to attach various accessories and peripheral devices, such as speaker 368 to mounting system 100. Accessory attachment 366 generally includes extrusion 370, hook assembly 372 and device interface 374. Extrusion 370 may be, for example, an aluminum extrusion having a cross-section as depicted in FIG. 36. Hook assembly 372 is attached to extrusion 370 with fasteners 376. It will be appreciated that hook assembly 372 may be attached at any desired location along extrusion 370 in order to adjust the position of device interface 374 and an attached device relative to cross-supports 112. Device interface 374 generally includes channel 378 and couplers 380. Couplers 380 are attached to channel 378 with fasteners 382 extending through slot 384 such that couplers 380 are selectively slidable along channel 378. Each coupler 380 defines an aperture 386 for receiving a fastener (not depicted) to attach a desired device such as speaker 368. In use, hook assembly 372 is engaged over cross-support 112 as depicted in FIG. 32 to suspend the accessory attachment 366 from mounting system 100.

Figure 45:
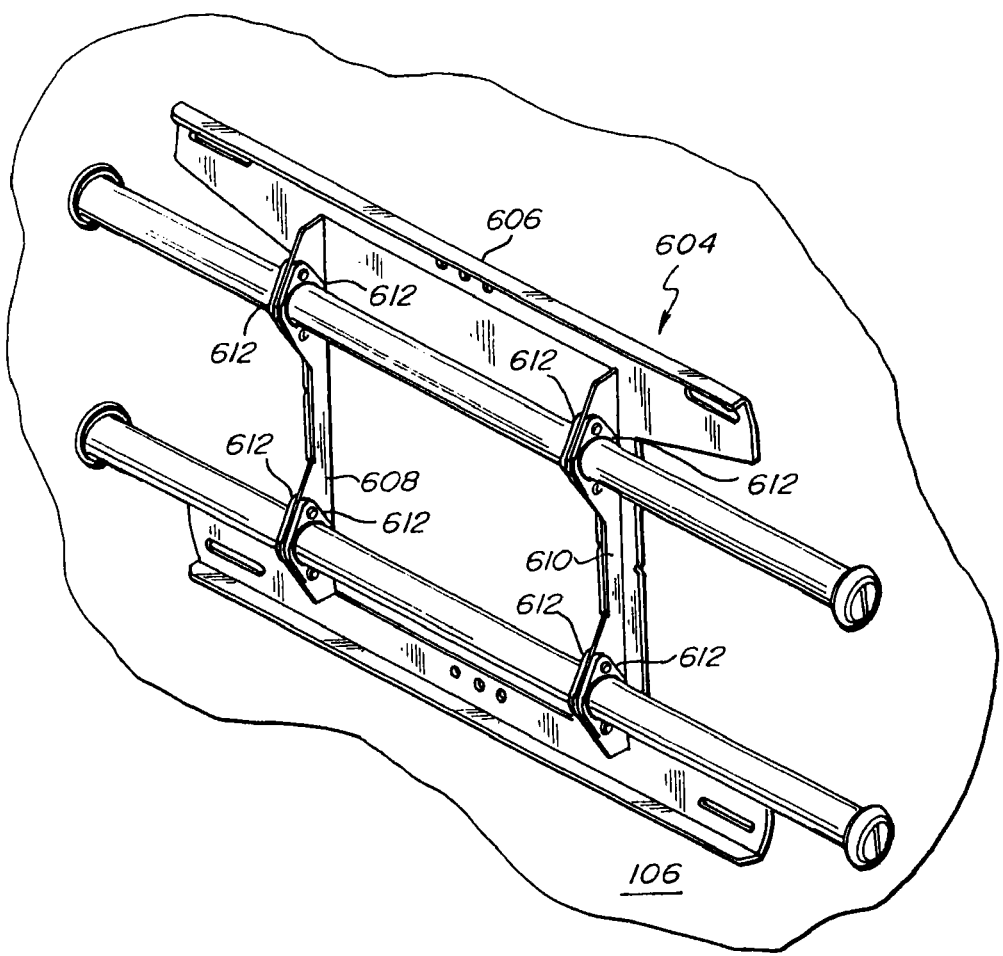
FIG. 45 is a front elevation view of a non-height adjustable embodiment of a mount according to the invention.

In FIG. 45 there is depicted a non-height adjustable version of a mount 604. Mount 604 generally includes frame 606 having a pair of forwardly projecting flanges 608, 610. Cross-supports 112 are received through apertures in each of flanges 608, 610, with bearing halves 612 on each side of the flange. Cross-supports 112 are laterally slidable as in the vertically adjustable version depicted in FIG. 42, thereby enabling a greater range of positioning for mount 604 on wall 106. It will be appreciated that mount 604 can be used alone in applications where height adjustability is not needed. It will also be appreciated that mount 604 can be used with one or more of mounts 100 to form multi-element arrays where some of the display elements are to be fixed in position and other elements of the array are to be tiltable or height adjustable.

Figure 39:
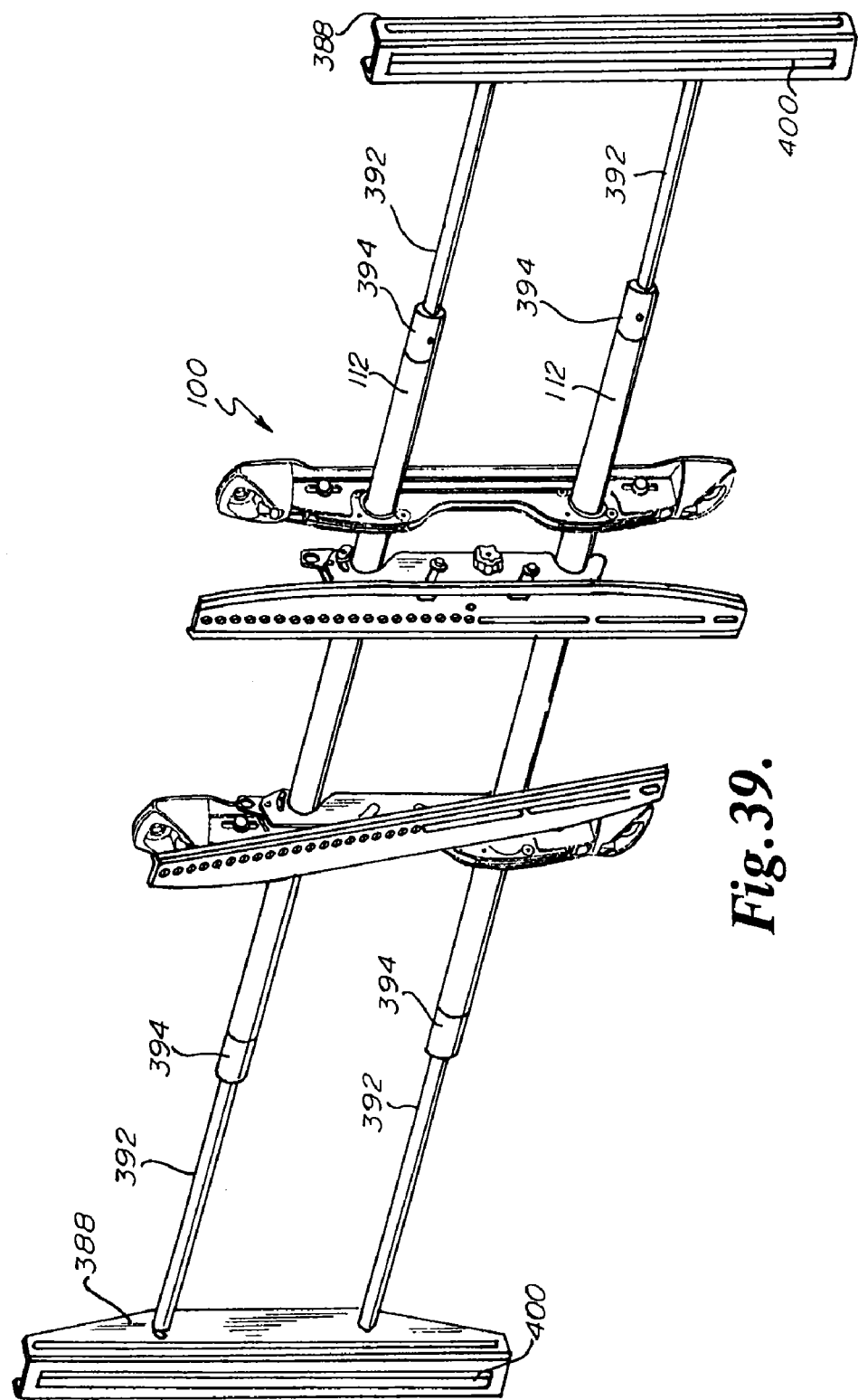
FIG. 39 is a front perspective view of side speaker attachments with a mount according to an embodiment of the invention.

In a further embodiment of the invention, speakers may be laterally attached so as to project on each side of the electronic display using speaker attachments 388 as depicted in FIGS. 39-41. Each speaker attachment 388 generally includes interface channel 390, rods 392 and coupler 394. Small end 396 of coupler 394 is received in the end of cross-support 112. Coupler 394 defines central bore 398 which slidably receives rod 392. Each rod 392 is coupled to channel 388. Channel 388 defines slot 400 for receiving fasteners (not depicted) to attach a speaker to the channel.

It will be appreciated that mount 100 and components thereof can be effectively distributed by packaging one or more of the described mount components in kit form along with user instructions 500 for assembling and attaching mount 100 to a wall 106, coupling display 102 to mount 100 and adjusting the position of cross-supports 112 and the tilt position of display interface brackets 114, 116, in order to position display 102 as desired. User instructions 500 may be provided in printed form as depicted in FIG. 1a, or in other formats such as video, CD or DVD.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A mount for attaching an electronic display to a fixed structure, the mount comprising:

a structure interface portion comprising a pair of horizontally spaced apart wall brackets and a pair of elongate cross supports, each wall bracket including a carrier portion, the cross supports vertically spaced apart and extending between the carrier portions of the wall brackets, wherein the carrier portion of each wall bracket is separately vertically positionable to alter the orientation of the cross supports relative to the fixed structure, and wherein each carrier portion includes a pair of floating connection structures, each floating connection structure receiving a separate one of the cross supports; and at least one display interface bracket received on the cross supports.

2. The mount of claim 1, wherein the floating connection structures are spherical bearings.

3. The mount of claim 1, wherein the cross supports are separately horizontally shiftable relative to the wall brackets.

4. The mount of claim 1, wherein the at least one display interface bracket includes a tilt mechanism, the tilt mechanism enabling an electronic display device attached to the at least one display interface bracket to be selectively tilted about a generally horizontal tilt axis.

5. The mount of claim 4, wherein the at least one display interface bracket presents a display receiving surface and wherein the tilt axis is positioned forward of the display receiving surface such that the tilt axis extends through the electronic display device.

6. The mount of claim 1, wherein the structure interface portion further comprises one or more frame members coupling the wall brackets.

7. An electronic display system comprising:
an electronic display device; and
a mount for attaching the electronic display device to a fixed structure, the mount comprising a structure interface assembly and a display interface assembly, the structure interface assembly including a plurality of wall brackets and a plurality of cross supports, the wall brackets horizontally spaced apart, each of the wall brackets including a guide structure and a carrier, the carrier selectively vertically shiftable relative to the guide structure with a height adjustment control, the cross supports vertically spaced apart and extending between the wall brackets, the cross supports received in the carriers of the wall brackets such that the cross supports are vertically shiftable with the carriers, the display interface assembly including a pair of display interface brackets spaced apart on the cross supports, the electronic display device received on the display interface brackets.

8. The system of claim 7, wherein each carrier includes a plurality of floating connection structures, each floating connection structure receiving a separate one of the cross supports.

9. The system of claim 8, wherein the floating connection structures are spherical bearings.

10. The system of claim 7, wherein the cross supports are separately horizontally shiftable relative to the wall brackets.

11. The system of claim 7, wherein each display interface bracket includes a tilt mechanism, the tilt mechanism enabling the electronic display device to be selectively tilted about a generally horizontal tilt axis.

12. The system of claim 11, wherein each display interface bracket presents a display receiving surface and wherein the tilt axis is positioned forward of the display receiving surface such that the tilt axis extends through the electronic display device.

13. The system of claim 12, wherein the tilt axis is positioned proximate a bottom edge of the electronic display device.

14. The system of claim 7, further comprising a plurality of electronic display devices and a plurality of mounts, each electronic display device mounted on a separate one of the mounts.

15. A mount for attaching an electronic display to a fixed structure, the mount comprising:
a structure interface comprising a pair of horizontally spaced apart wall brackets and a pair of elongate cross supports, each wall bracket including a carrier slidably shiftable in a guide structure, the carrier including a pair of floating connection structures, the cross supports vertically spaced apart and extending between the carriers of the wall brackets, each cross support received in a separate one of the floating connection structures of each carrier; and
at least one display interface bracket received on the cross supports.

16. The mount of claim 15, wherein the floating connection structures are spherical bearings.

17. The mount of claim 15, wherein the cross supports are separately horizontally shiftable relative to the wall brackets.

18. The mount of claim 15, wherein the at least one display interface bracket includes a tilt mechanism, the tilt mechanism enabling an electronic display device attached to the at least one display interface bracket to be selectively tilted about a generally horizontal tilt axis.

19. The mount of claim 15, wherein the structure interface further comprises one or more frame members coupling the wall brackets.

20. The mount of claim 15, further comprising a shelf assembly operably coupled with one or more of the cross supports.

21. The mount of claim 15, further comprising a speaker attachment operably coupled with one or more of the cross supports.

* * * * *